United States Patent
Kacarov et al.

(10) Patent No.: US 7,823,190 B1
(45) Date of Patent: Oct. 26, 2010

(54) SYSTEM AND METHOD FOR IMPLEMENTING A DISTRIBUTED KEYSTORE WITHIN AN ENTERPRISE NETWORK

(75) Inventors: Ilia Kacarov, Sofia (BG); Hiltrud Jaeschke, Muenster (DE); Stephan Zlatarev, Stara Zagora (BG)

(73) Assignee: SAP AG, Walldorf (DE)

( * ) Notice: Subject to any disclaimer, the term of this patent is extended or adjusted under 35 U.S.C. 154(b) by 1456 days.

(21) Appl. No.: 10/860,477

(22) Filed: Jun. 2, 2004

(51) Int. Cl.
*H04L 9/08* (2006.01)

(52) U.S. Cl. .......................... 726/6; 713/156; 380/278

(58) Field of Classification Search ................ 713/157, 713/155, 156, 165, 166; 380/278, 279, 286; 726/5, 6, 18
See application file for complete search history.

(56) References Cited

U.S. PATENT DOCUMENTS

| | | | |
|---|---|---|---|
| 6,263,446 B1* | 7/2001 | Kausik et al. | 726/5 |
| 6,289,460 B1* | 9/2001 | Hajmiragha | 726/28 |
| 6,324,645 B1* | 11/2001 | Andrews et al. | 713/157 |
| 6,920,567 B1* | 7/2005 | Doherty et al. | 726/22 |
| 2002/0116647 A1* | 8/2002 | Mont et al. | 713/201 |
| 2005/0188217 A1* | 8/2005 | Ghanea-Hercock | 713/200 |

* cited by examiner

*Primary Examiner*—Kimyen Vu
*Assistant Examiner*—Edward Zee
(74) *Attorney, Agent, or Firm*—Blakely, Sokoloff, Taylor & Zafman

(57) ABSTRACT

A keystore is described which provides unique views of certificates and keys to particular application components and/or users. Upon receiving a request from a user and/or an application component to view keystore data, the keystore system implements a first set of security restrictions associated with the request and provides a limited view of the keystore data to the requesting user and/or application component based on the results of the first set of security restrictions. Then, upon detecting an attempt by the user and/or application component to access specified portions of the keystore data provided in the view, the keystore system implements a second set of security restrictions associated with the attempt to access the specified portions of the keystore data, and provides access to the keystore data to the user and/or application component based on the results of the second set of security restrictions.

20 Claims, 21 Drawing Sheets

US 7,823,190 B1

SYSTEM AND METHOD FOR IMPLEMENTING A DISTRIBUTED KEYSTORE WITHIN AN ENTERPRISE NETWORK

BACKGROUND

1. Field of the Invention

This invention relates generally to the field of data processing systems. More particularly, the invention relates to a system and method for managing a keystore within a distributed enterprise architecture.

2. Description of the Related Art

Multi-Tier Enterprise Computing Systems

JAVA™ 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

FIG. 1 illustrates an exemplary J2EE application server 100 in which the presentation layer is implemented as a Web container 111 and the business layer is implemented as an Enterprise JAVA™ Bean ("EJB") container 101. Containers are runtime environments which provide standard common services 119, 109 to runtime components. For example, the JAVA™ Naming and Directory Interface ("JNDI") is a service that provides application components with methods for performing standard naming and directory services. Containers also provide unified access to enterprise information systems 117 such as relational databases through the JAVA™ Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1, each layer of the J2EE architecture includes multiple containers. The Web container 111, for example, is itself comprised of a servlet container 115 for processing servlets and a JAVA™ Server Pages ("JSP") container 116 for processing JAVA™ server pages. The EJB container 101 includes three different containers for supporting three different types of enterprise JAVA™ beans: a session bean container 105 for session beans, a entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Security within a Multi-Tier Architecture

Distributed computing architectures such as J2EE employ a variety of techniques for implementing system security including authentication, authorization, encryption (both symmetric and asymmetric), and digital signatures and certificates. "Authentication" refers to verifying the identity of a client or application component. The most well known form of authentication involves the submission by the client/component of a unique user name and password. "Authorization" involves controlling access to system resources (e.g., sections of the database, features of an application, . . . etc) based on the identify of the client or component. For example, once authenticated an "administrator" will typically be authorized to access any area of a J2EE application server, whereas a typical user's access will be restricted to specified regions.

Data "encryption" refers to the process of encoding data so that it can only be decrypted by other applications/users with an encryption "key." In symmetric encryption, the same key used to encrypt the data is used to decrypt the data. By contrast, asymmetric encryption uses two keys: one which is used to encrypt the data and another which is used to decrypt the data. One of the two keys us typically made public (the "public key"), while the other is kept private to the key owner (the "private key"). When data is encrypted using the public key, only the key owner can decrypt it. Conversely, when the data is encrypted using the private key, the data can only be decrypted using the public key. Thus, the ability to decrypt data using the public key verifies that the originator of the data must be the key owner.

A "digital signature" represents a digital guarantee that a file has not been altered (e.g., as if it were carried in an electronically sealed envelope). The "signature" is an encrypted digest (e.g., one-way hash function) of the encrypted data. The recipient decrypts the digest that was transmitted with the data and also recomputes the digest from the received data. If the digests match, the data is verified as valid.

To verify that the data was sent by the person or organization claiming to send it requires a "digital certificate" which is issued by a certification authority. A signed digital certificate contains a message digest of the certificate encrypted using the private key of the certificate authority. Thus, any recipient of the certificate can decrypt the digest using the certificate authority's public key (i.e., and verify that the reminder of the certificate has not been corrupted). Digital certificates are specified by the X509 international standard which specifies a format for representing public keys and other types of information related to an entity (e.g., a user, application, company or any other entity with a public key).

In a J2EE system, a storage unit referred to as a "keystore" is used to manage all of the system's keys and certificates. Applications can access the keystore through an implementation of the KeyStore class in the JAVA™ security package.

As illustrated in FIG. 2, a prior art keystore 100 is managed in a single, centralized location and is accessible via a single keystore application programming interface ("API") 101 (developed by Sun Microsystems™). As a result, applications and/or other clients 202-204 must compete for access to the keystore, resulting in inefficient retrieval of keys 105-107 and/or certificates 110-112, particularly in a large enterprise network. In addition, the prior art keystore API 101 either grants access or denies access to particular keys and certificates within the keystore 100, but does not uniquely tailor the views of the keystore 100 based on the identity of the different application components and/or users. Thus, each component and/or user 202-204 will be provided with essentially the same view of the keystore 100.

SUMMARY

A keystore is described which is designed to work more efficiently in a distributed enterprise environment. The keystore provides unique views of the certificates and keys to particular application components and/or users. In one embodiment, upon receiving a request from a user and/or an application component to view keystore data, the keystore system implements a first set of security restrictions associated with the request to view the keystore data and provides a limited view of the keystore data to the requesting user and/or application component based on the results of the first set of security restrictions. Then, upon detecting an attempt by the user and/or application component to access specified portions of the keystore data provided in the view (e.g., to use the keystore data), the keystore system implements a second set of security restrictions associated with the attempt to access the specified portions of the keystore data, and provides access to the keystore data to the user and/or application component based on the results of the second set of security restrictions.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing multiple application server clusters using a central management arrangement. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Exemplary Network Architecture

In one embodiment of the invention, the management techniques which are the focus of this application are used to manage resources within a cluster of application servers. An exemplary application server architecture will now be described, followed by a detailed description of the improved keystore architecture and associated processes.

Figure 3:
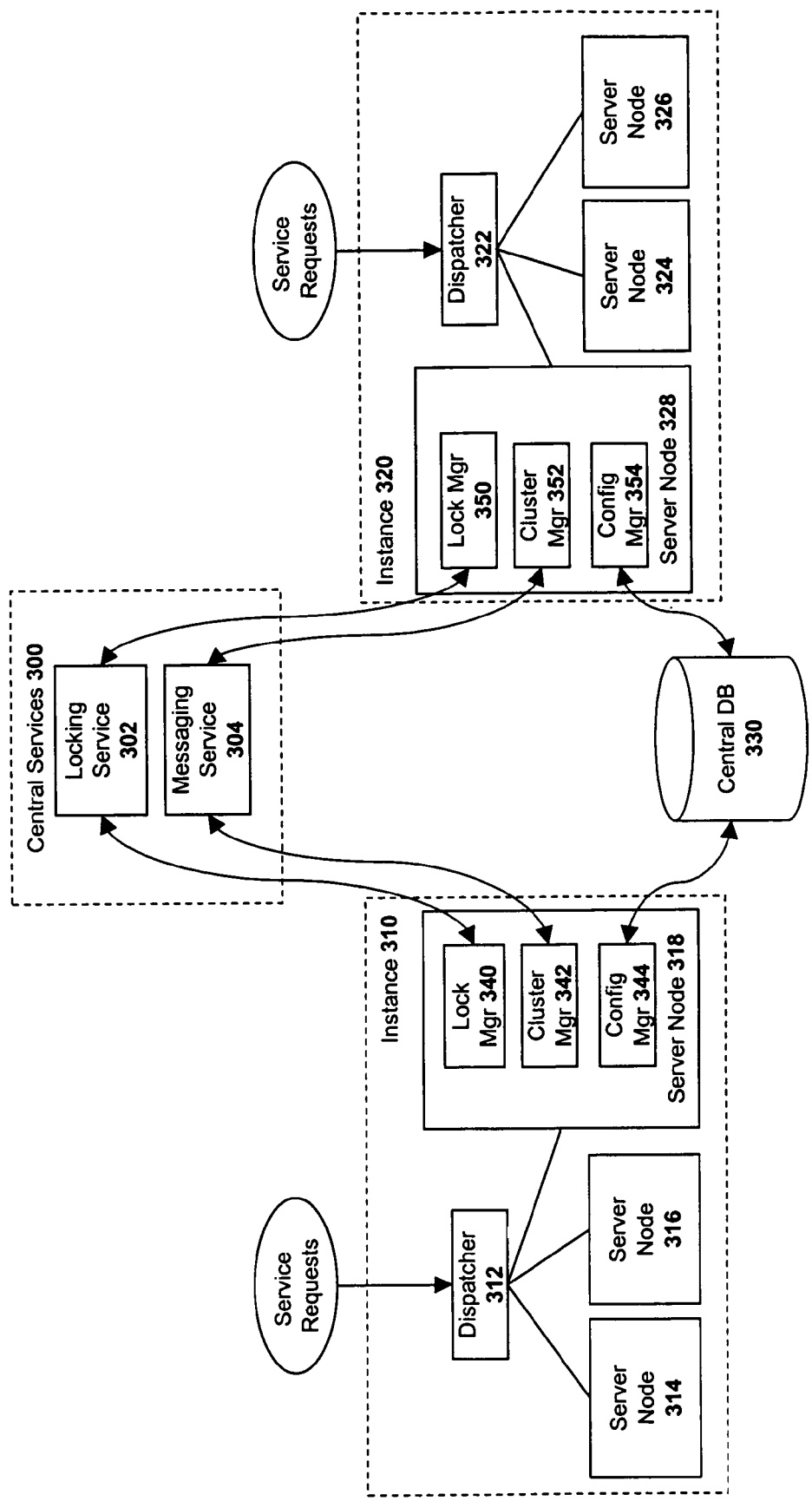
FIG. 3 illustrates an exemplary network architecture on which embodiments of the invention may be employed.

An application server architecture employed in one embodiment of the invention is illustrated in FIG. 3. The architecture includes a central services "instance" 300 and a plurality of application server "instances" 310, 320. As used herein, the application server instances, 310 and 320, each include a group of server nodes 314, 316, 318 and 324, 326, 328, respectively, and a dispatcher, 312, 322, respectively. The central services instance 300 includes a locking service 302 and a messaging service 304 (described below). The combination of all of the application instances 310, 320 and the central services instance 300 is referred to herein as a "cluster." Although the following description will focus solely on instance 310 for the purpose of explanation, the same principles apply to other instances such as instance 320.

The server nodes 314, 316, 318 within instance 310 provide the business and/or presentation logic for the network applications supported by the system. Each of the server nodes 314, 316, 318 within a particular instance 310 may be configured with a redundant set of application logic and associated data. In one embodiment, the dispatcher 310 distributes service requests from clients and/or application components to one or more of the server nodes 314, 316, 318 based on the load on each of the servers. For example, in one embodiment, the dispatcher 310 implements a round-robin policy of distributing service requests (although various alternate load balancing techniques may be employed).

In one embodiment of the invention, the server nodes 314, 316, 318 are JAVA™ 2 Enterprise Edition ("J2EE") server nodes which support Enterprise JAVA™ Bean ("EJB") components and EJB containers (at the business layer) and Servlets and JAVA™ Server Pages ("JSP") (at the presentation layer). Of course, certain aspects of the invention described herein may be implemented in the context of other software platforms including, by way of example, Microsoft® .NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate with and synchronize with one another via a message passing protocol. For example, messages from one server may be broadcast to all other servers within the cluster via the messaging service 304. In addition, messages may be addressed directly to specific servers within the cluster (i.e., rather than being broadcast to all servers).

In one embodiment, the locking service 302 disables access to (i.e., locks) certain specified portions of configuration data and/or other program code (e.g., such as keystore data) stored within a central database 330. A locking manager 340, 350 employed within the server nodes locks data on behalf of various system components which need to synchronize access to specific types of data and program code (e.g., such as the configuration managers 344, 354 illustrated in FIG. 3). As described in detail below, in one embodiment, the locking service 302 enables a distributed caching architecture for caching copies of various types of server/dispatcher data including keystore data (as described below).

In one embodiment, the messaging service 304 and the locking service 302 are each implemented on dedicated servers. However, the messaging service 304 and the locking service 302 may be implemented on a single server or across multiple servers while still complying with the underlying principles of the invention.

As illustrated in FIG. 3, each application server (e.g., 318, 328) includes a lock manager 340, 350 for communicating with the locking service 302; a cluster manager 342, 352 for communicating with the messaging service 304; and a configuration manager 344, 354 for communicating with a central database 330 (e.g., to store/retrieve configuration data). Although the lock manager 340, 350, cluster manager 342, 352 and configuration manager 344, 354 are illustrated with respect to particular server nodes, 318 and 328, in FIG. 3, each of the server nodes 314, 316, 324 and 326 and/or on the dispatchers 312, 322 may be equipped with equivalent lock managers, cluster managers and configuration managers.

Figure 4:
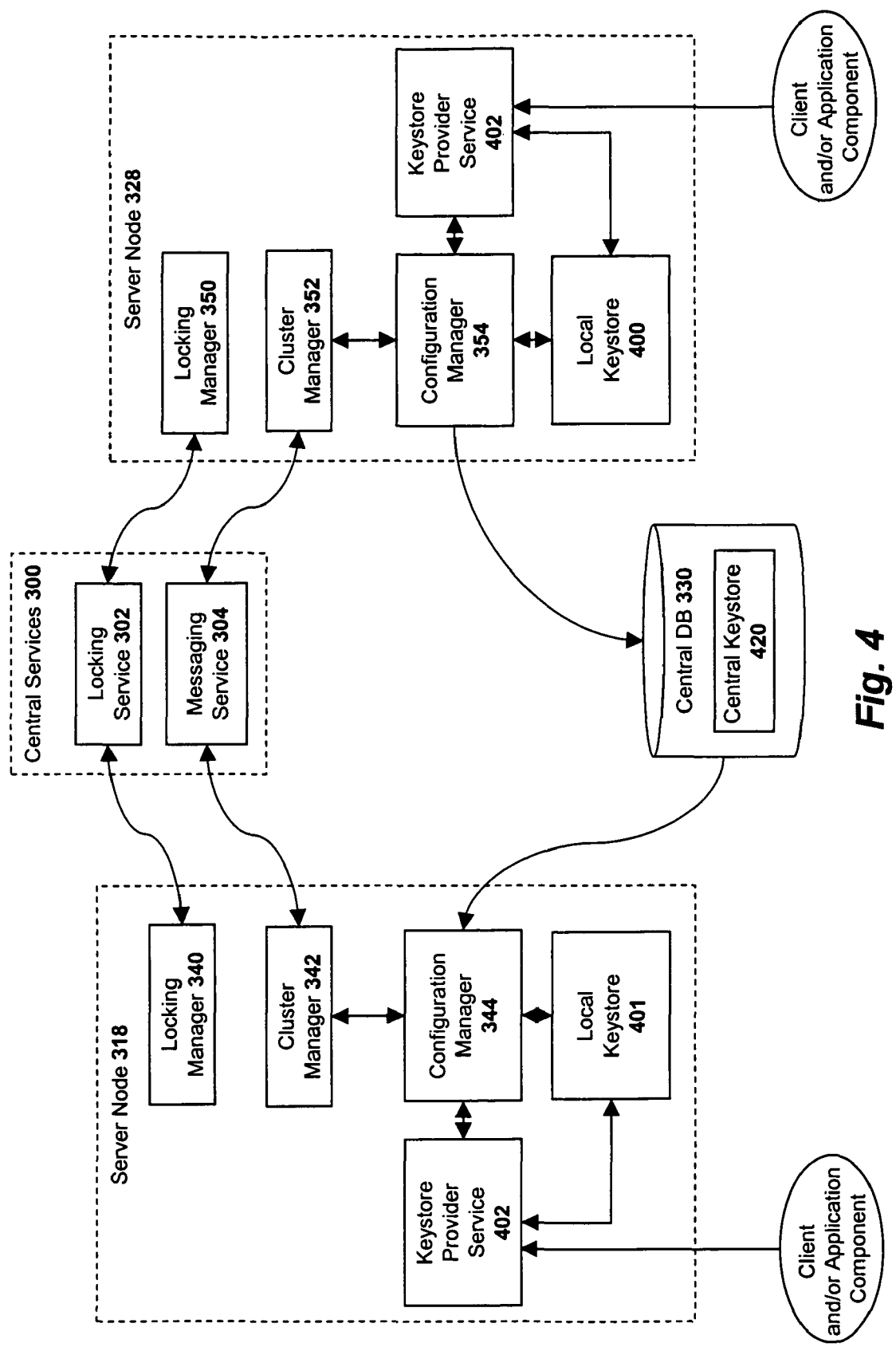
FIG. 4 illustrates one embodiment of a system for distributing keystore data across a plurality of server nodes.

System and Method for Implementing a Distributed Keystore within an Enterprise Network In one embodiment of the invention, the distributed architecture described above is employed to distribute keystore data throughout the cluster. Referring now to FIG. 4, in one embodiment, keystore data 420 is stored within the central database 330. The keystore data may include private cryptographic keys, public certificates or any other type of security data associated with particular users and/or application components.

To improve the speed at which the servers and dispatchers access the keystore data and to improve security, a keystore provider service 402 accessible throughout the cluster caches keystore data locally within local keystore caches 400, 401. In addition, in one embodiment, the keystore provider service 402 uses the cache synchronization policies of the configuration manager 344, 354 to ensure the integrity of the keystore data in a distributed environment.

Figure 5:
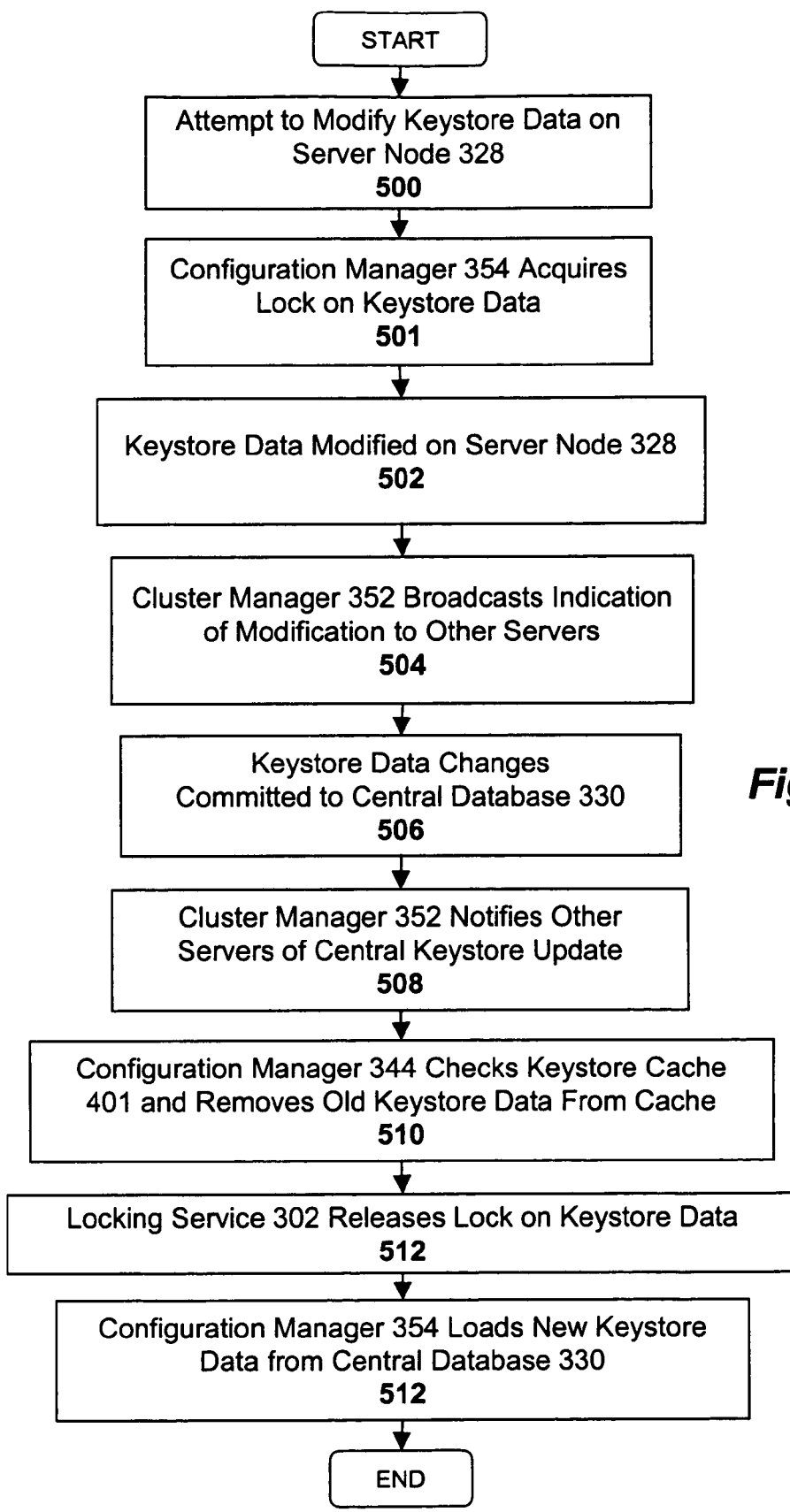
FIG. 5 illustrates one embodiment of a method for synchronizing keystore data across a plurality of server nodes.

One embodiment of a method for synchronizing the keystore 420 across each of the application server instances 310, 320 and the central services instance 300 is illustrated in FIG. 5. for the purpose of illustration, it is assumed initially that certain portions of the keystore data from the central database are cached locally within configuration cache 400 and configuration cache 401.

At 500 of FIG. 5, a user or network administrator attempts to access or modify the keystore data stored within configuration cache 400 on application server 328. In response, the configuration manager 354 attempts to acquire a lock on the relevant portions of the keystore data by transmitting a lock request to the locking service 302. If the keystore data is not being currently modified by another transaction, then the locking service locks the keystore data on behalf of the configuration manager 354. Once locked, the configuration managers 344 of other server nodes 318 will not be permitted to access or acquire a lock on the keystore data.

At 502, the keystore data within the configuration cache 400 of application server 328 is modified. At 504, the cluster manager 352 broadcasts an indication of the modified keystore data to the cluster manager 342 on server node 318 and the cluster manager of other server nodes (i.e., via the messaging service 304). At 506, the modifications to the keystore data are committed to the keystore 420 within the central database 330. At 508, the cluster manager 352 notifies the cluster manager 342 on server node 318 and the cluster managers of other server nodes of the central database update. In response, the configuration manager 344 invalidates the modified keystore data from its cache 401 and, at 512, loads the new keystore data from the central database 330. In one embodiment, the configuration manager 344 only downloads the portion of the keystore data which has been modified (i.e., rather than the entire set of keystore data). In one embodiment, to determine whether it needs to update its keystore data, the configuration manager 344 compares the version of its keystore data with the version of the keystore data stored the central database.

Although described above in the context of a central keystore configuration in which keystore data is distributed to a plurality of keystore caches, it will be appreciated that a "central" keystore configuration is not required for complying with the underlying principles of the invention. For example, in one embodiment, multiple separated and independent physical key stores may be employed on each of the server nodes in the cluster. Different views of the separate, distributed keystores may then be provided to requesting application components and/or users by the keystore provider service 402. In one embodiment, the independent keystore implementations are individual Sun Microsystems™ keystore APIs managed by the keystore provider service 402. In this embodiment, each individual keystore API may be identified by a unique name (e.g., an alias) or other type of unique identification code.

Figure 6:
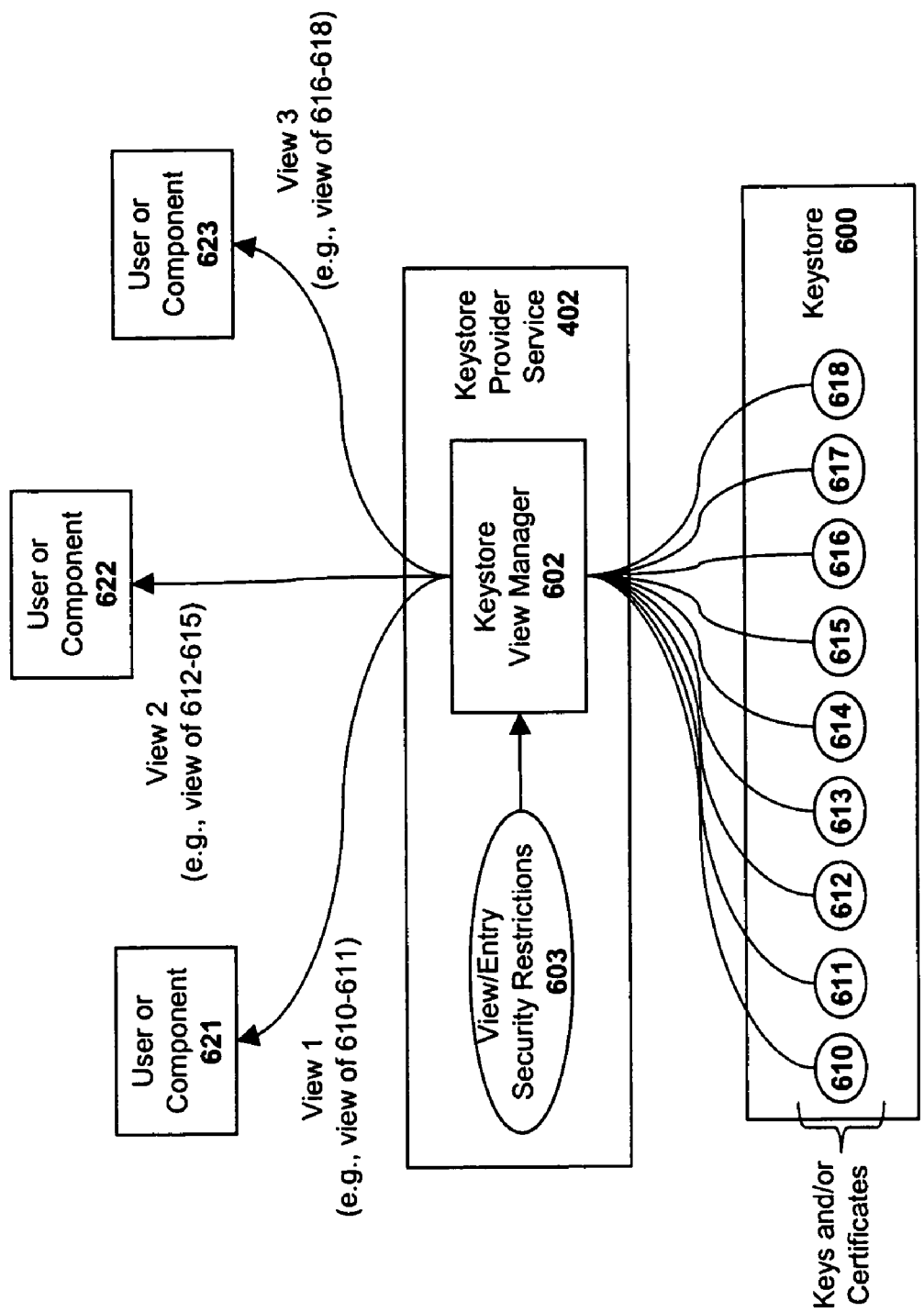
FIG. 6 illustrates one embodiment of the invention for providing different keystore views based on the identity of the calling user and/or application component.

In addition to distributing the keystore data throughout the cluster as described above, one embodiment of the invention improves security associated with the keystore by providing only limited views of the keystore to users and/or application components. As illustrated in FIG. 6, this embodiment includes a keystore view manager 602 for generating different keystore views. In one embodiment, the different views are generated based on the identify of the user and/or application component. As described in greater detail below, a set of view/entry restrictions 603 are implemented by the keystore view manager 602 when generating specific views and providing limited keystore access for each user/component. In the specific example shown in FIG. 6, while the keystore 600 is comprised of a full set of keys and/or certificates 610-618, a limited view of the keystore 600 is provided to each of three clients/components 621-623. Specifically, client/component 621 is provided with a view of keys/certificates 610-611; client/component 622 is provided with a view of keys/certificates 612-615; and client/component 623 is provided with a view of keys/certificates 616-618. Each of these views may be defined within the set of view/entry restrictions 603 (e.g., generated by an administrator or user).

Figure 7A:
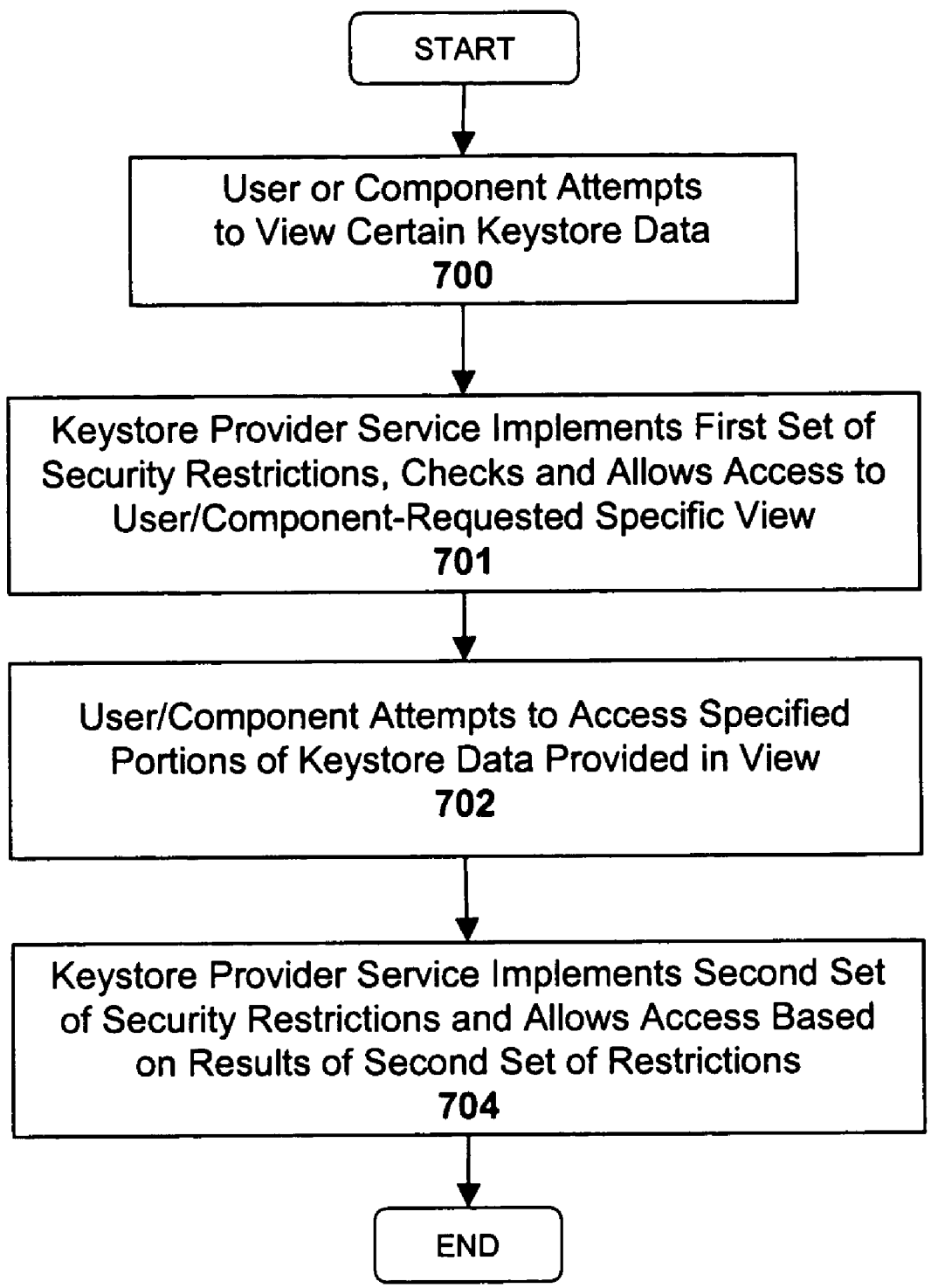
FIG. 7 illustrates one embodiment of a method for providing different keystore views based on the identity of the calling user and/or application component.
Figure 7B:
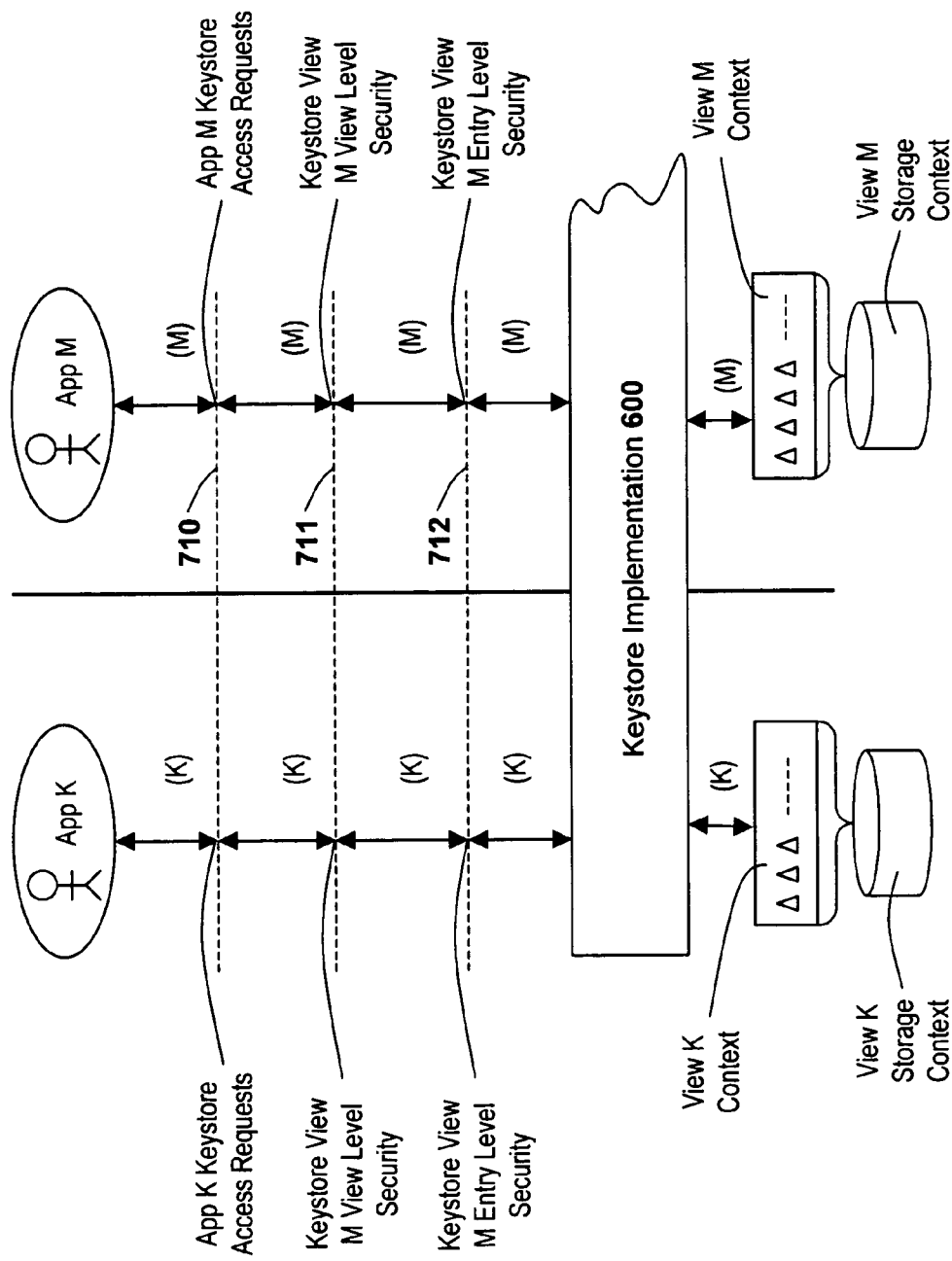

FIG. 7a illustrates one embodiment of a method for providing keystore views and access to different applications and users and FIG. 7b illustrates additional details associated with the keystore view manager 602. At 700, a user and/or application component attempts to view certain keystore data such as a private key or certificate needed to establish a secure session. In FIG. 7b, for example, at 710, Applications K and M each make access requests to the keystore. In one embodiment, the keystore access requests are based on the standard JAVA™ keystore API (i.e., calls to the Sun Microsystems™ keystore API). However, calls to a standard API are not required for complying with the underlying principles of the invention.

At 701, the keystore service implements a first set of security restrictions and allows access to the requested (i.e., from the user/component) keystore view based on the user/component identity. In FIG. 7b, for example, different view level security requirements are applied to Applications K and M at 711. Various types of authentication may be employed to verify the identity each user and/or application component requesting a particular view (e.g., via a valid ID code and password provided by the user/component).

After the specific view is provided to a particular user/component, at 702, the user/component may attempt to access specified portions of keystore data provided in view, referred to herein as an "entry" into the keystore from the view provided to the user/component. For example, a particular application component may attempt to access a private key stored within the keystore 600.

At 704, in response to detecting the attempted entry from the specific view, the keystore provider service 402 implements a second set of security restrictions and provides access to the user/component based on the results of the second set of restrictions. In FIG. 7b, for example, different entry level security requirements are applied to Applications K and M at 712. The second set of security restrictions may include a separate authentication mechanism for the user/component. The end result in the example shown in FIG. 7b, is that Applications K and M are provided with unique views and storage contexts when accessing the keystore 600.

In one embodiment, the keystore provider service 402 may impose the first and/or second set of security restrictions on both a per code and a per user basis. In one embodiment, the code-based and user-based security checks are executed independently of one another and both must succeed to pass a particular set of security restrictions.

For example, in an SSL server implementation, the SSL server may require two sets of keystore entries: server credentials (i.e., a private key and public key pair) and a set of public keys of all trusted certificates authorities (i.e., all SSL client public keys must be signed by some trusted CA public key, to be accepted from the SSL server). In prior systems, all of these keystore entries were stored in a single common keystore view. Using the embodiments of the invention described herein, however, the SSL server may be provided with two different views and access restrictions. One view, for example, may be provided for the server credentials (i.e., which includes all used private+public key pairs), and another view may be provided for the trusted CA certificates public keys. The trusted CA "view" may include free read access for all applications and users (which is logical because it contains only public keys), whereas the server credentials "view" may be is restricted to be accessible only for the SSL server and the users with administrator's rights.

Note that in the foregoing example, the application and the user may not receive the keystore instance if they both do not have the appropriate code-based and user-based security permissions. They may not even be able to see that this view of the keystore exists at all. In addition, even if a view is provided, the application and the user may not be provided with entry without the necessary code-based and user-based security permissions (i.e., an entry alias will not be listed in the view result).

Using a Monitor Service to Monitor a Keystore

When digital certificates such as X.509 certificates expire, they will no longer be accepted by remote peers and will fail the standard SSL handshake required to initiate SSL sessions. Thus, it is important for the system administrator to be notified before any such certificates expire so that undesirable connection failures can be prevented.

To this end, one embodiment of the invention employs a monitor service to monitor various aspects of the keystore 402 to ensure that the keystore is up-to-date and functioning properly. For example, one embodiment of the invention provides monitors to monitor the expiration of the certificates in use and notify the administrator when a certificate is about to expire.

In one embodiment of the invention, the monitor service is built around the JAVA™ Management Extensions ("JMX") Standard. Accordingly, a description of the JMX standard and certain enhancements to that standard will now be provided.

Figure 8:
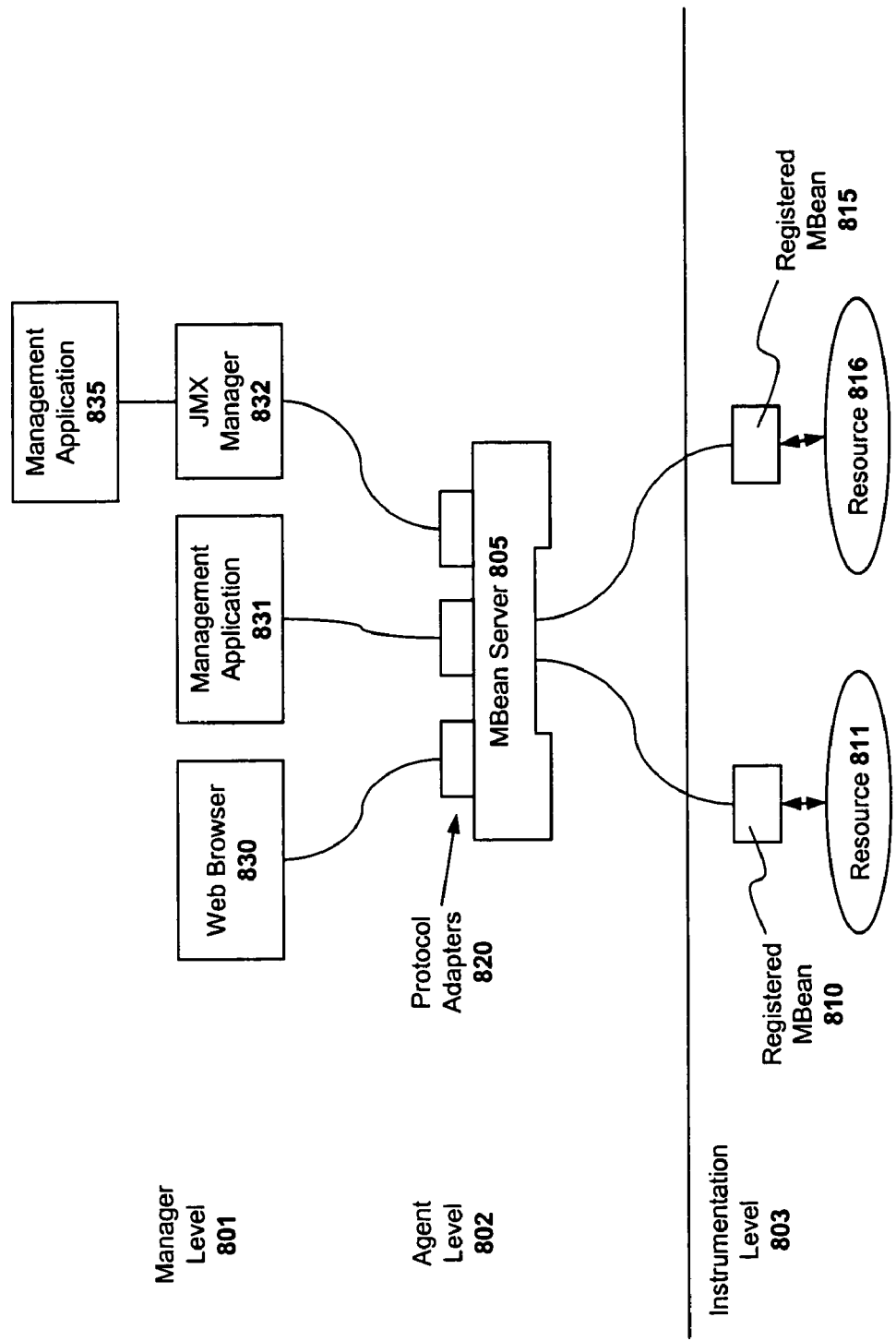
FIG. 8 illustrates the various levels of the JAVA™ Management Extensions ("JMX") architecture.

As illustrated in FIG. 8, the JMX architecture is divided into three levels: an "instrumentation" level 893; an "agent" level 802; and a "manager" level 801. At the instrumentation level 803, JAVA™ management beans ("MBeans") 810, 815 are used to manage manageable system resources 811, 816, respectively. A "manageable" resource is a resource that has been instrumented in accordance with the JMX instrumentation-level specification. By way of example, a manageable resource may include components of a business application, a device, or the implementation of a service or policy. MBeans 810, 815 are JAVA™ objects that represent the JMX manageable resources 811, 816.

An MBean server 805 at the agent level 802 is a registry for MBeans. A JMX "agent" is composed of an MBean server 805, a set of MBeans 810, 815 registered with the MBean server 805 (i.e., representing managed resources 811, 816), and one or more protocol adaptors and/or connectors 820. The MBean server 805 is a J2EE component which provides services that allow the manipulation of MBeans. All management operations performed on MBeans are performed via the MBean server 805.

The manager level 801 provides management components that can operate as a manager or agent for distribution and consolidation of management services. Different management interfaces may be employed at the management level such as Web Browsers 830 and/or proprietary management applications 831, 835. JMX managers 832 implemented within the manager level 801 provide an interface for management applications to interact with the agent, distribute or consolidate management information, and provide security.

A detailed description of the JMX specification can be found on the Sun Microsystems™ Website.

In one embodiment of the invention, a management architecture specifically adapted to a clustered enterprise environment described above. Specifically, in one embodiment, each server, dispatcher, and/or central services instance (referred to generally as "nodes") within the system is provided with a dedicated MBean server to register MBeans for monitoring specified system resources.

Virtually any type of system resource may be monitored in this manner including, but not limited to application resources, kernel resources, services, managers, components, interfaces and libraries associated with the individual nodes within the system. By way of example, within a J2EE engine, state information related to memory management, thread management, locking and licensing may be of particular importance. Once collected, this information may be combined and provided in a comprehensive manner to the end user or system administrator.

Figure 9:
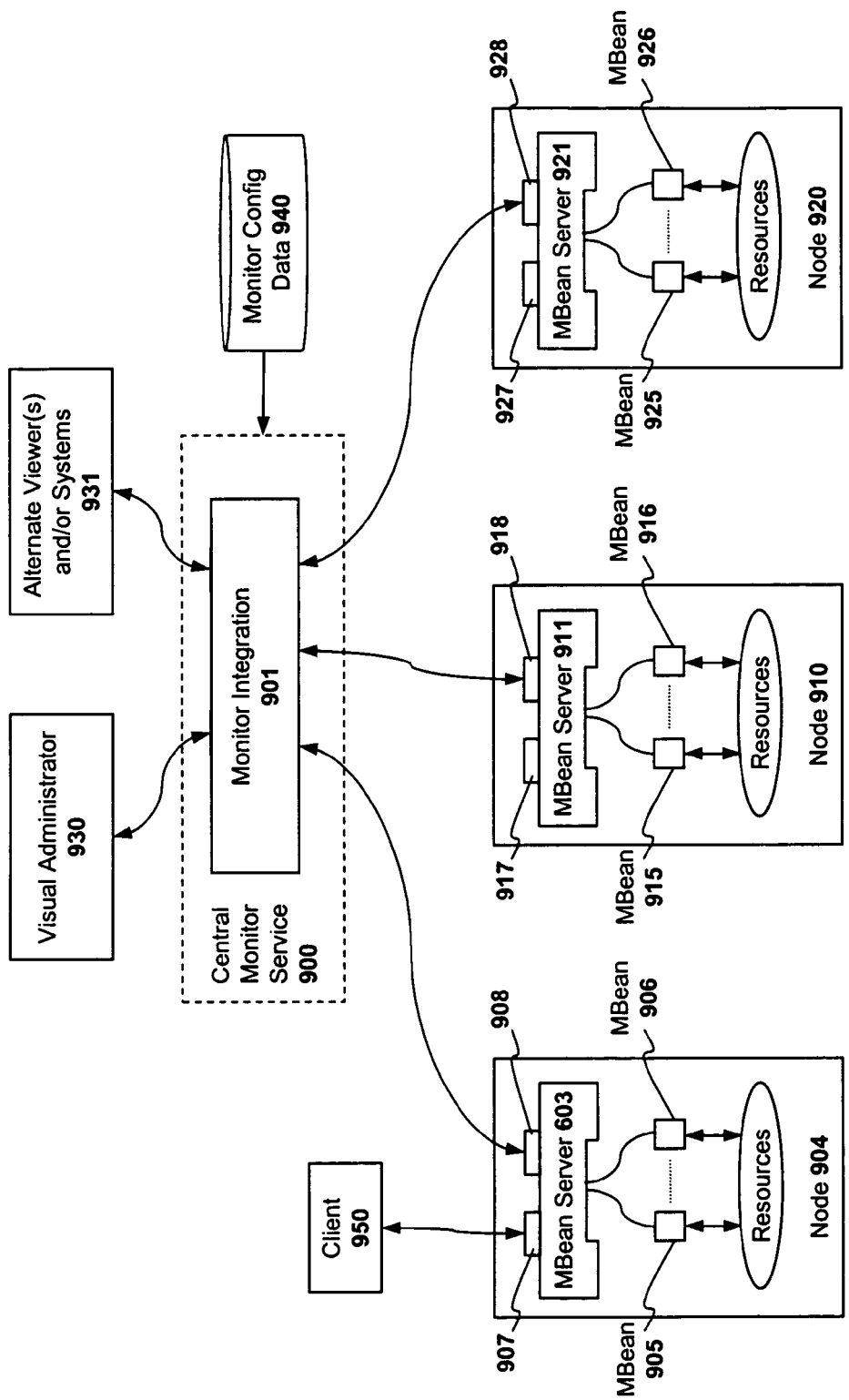
FIG. 9 illustrates a central monitor service with monitor integration logic according to one embodiment of the invention.

FIG. 9 illustrates an exemplary embodiment of the invention in which resource information is monitored on different cluster nodes 904, 910 and 920. The cluster nodes 904, 910 and 920 may represent any of the different types of nodes illustrated in FIGS. 3-4 including, for example, dispatchers 312, server nodes 318 and/or central services nodes 300.

In the illustrated embodiment, separate MBean servers 903, 911, and 921, are executed on each of the nodes 904, 910, and 920, respectively. Different types of MBeans may register with each of the MBean servers to monitor different types of system/node resources. For the purpose of illustration, only two MBeans are shown registered with each MBean server in FIG. 9. Specifically, MBeans 905 and 906 are registered with MBean server 903 on node 904; MBeans 915 and 616 are registered with MBean server 911 on node 910; and MBeans 925 and 926 are registered with MBean server 921 on node 620. It will be appreciated that, in an actual implementation, significantly more MBeans may be registered with each MBean server and a significantly greater number of nodes may be employed on the system.

In one embodiment, a central monitoring service 600 employed within the distributed configuration hides the clusterization of the various MBean servers and provides a unified view of managed resources at the manager level 201. Specifically, monitor integration logic 901 associated with the central monitoring service 900 combines the monitoring data collected from each of the individual MBean servers 903, 911, 921 and generates an comprehensive, logical view of the monitored resources. The monitoring data may then be displayed on a visual administrator 930 and/or any other type of graphical user interface 931 (e.g., such as a standard Web browser). In one embodiment, the integration logic 901 combines the monitoring data based on monitor configuration information 940 (e.g., node layout, monitoring parameters, ... etc) stored within the central database 230. As described below with respect to FIG. 11a-b, in one embodiment, the monitor integration logic 901 includes monitor MBeans arranged in a logical monitor tree hierarchy.

The central monitor service 900, clients 950 and/or any other module/object may communicate with the MBean servers 903, 911, 921 via protocol adapters and/or connectors, represented in FIG. 9 as blocks 907, 908, 917, 918, 927, and 928. Protocol adapters and connectors are similar in that they serve the same general purpose—i.e., to expose an MBean server to managing entities. The primary difference between them is how they accomplish this task. Protocol adapters generally listen for incoming messages that are constructed in a particular protocol (e.g., such as like HTTP or SNMP). As such, protocol adapters are comprised of only one component that resides in the MBean server. For example, if client 950 is a browser-equipped client, it may communicate with the MBean server 903 via an HTTP protocol adapter 950.

By contrast, connectors are generally comprised of two components, one which resides on the MBean server and the other which resides on the client-side applications. Thus, connectors hide the underlying protocol being used to contact the MBean server (i.e., the entire process happens between the connector's two components). Throughout this detailed description, it is assumed that communication with an MBean server occurs via a protocol adapter and/or connector of that MBean server, notwithstanding the fact that the protocol adapter/connector may not be explicitly described or illustrated.

Figure 10A:
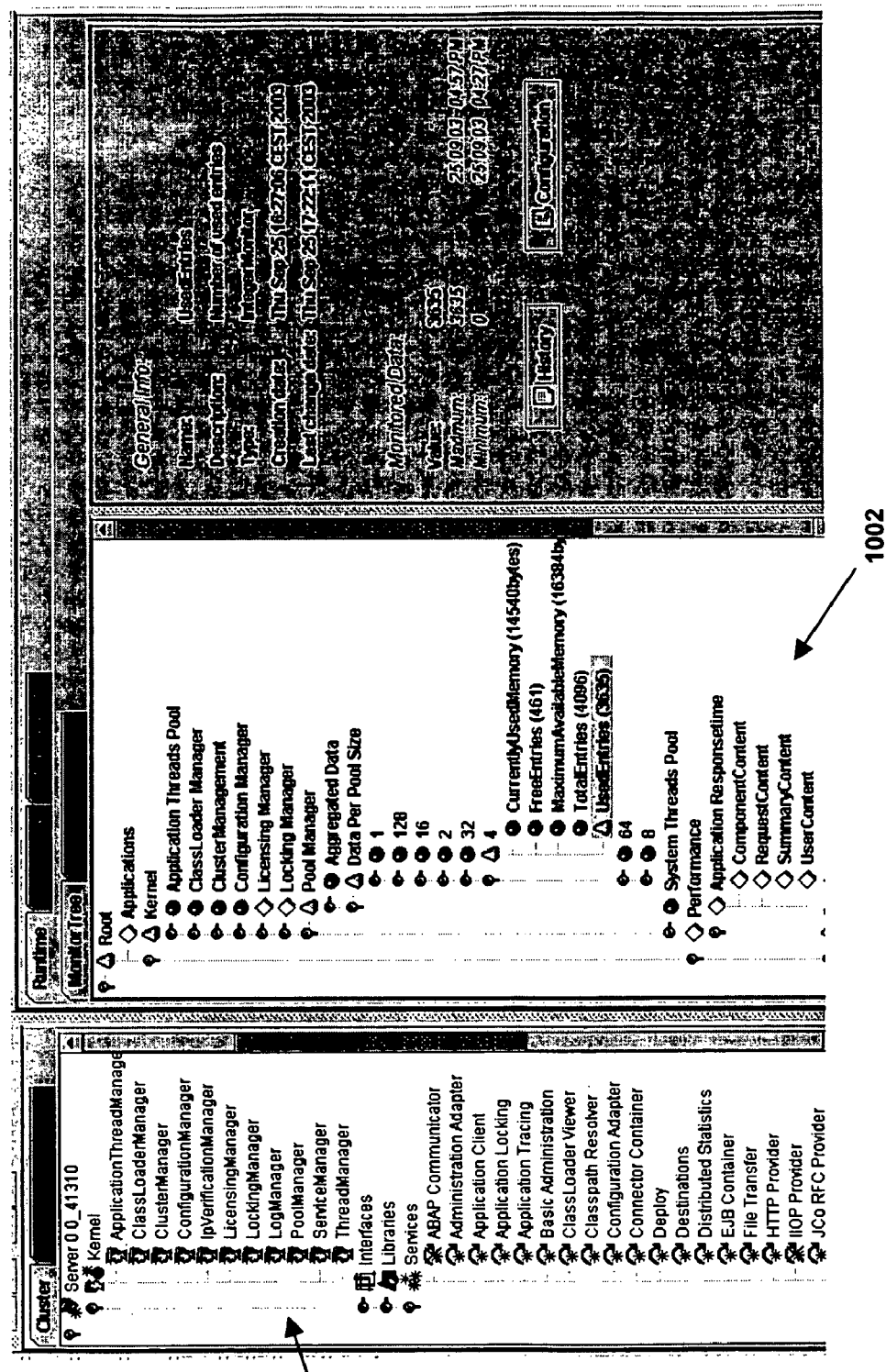
FIGS. 10a-b illustrate a graphical visual administrator used for viewing monitor data according to one embodiment of the invention.

FIG. 10a illustrates an exemplary monitor viewer 1000 for navigating through resource information collected and compiled by the central monitoring service 900. The monitor viewer includes a first window 1001 containing a hierarchical representation of each system node (e.g., "Server 0 0_41310"). Under each node entry is a set of categories related to that node. For example, entries for "Kernel," "Interfaces," "Libraries" and "Services" are shown under Server 0 0_41301. When a user selects a particular node in the first window 1001, a hierarchical monitor tree displays monitor data related to that node in a second window 900. As described below, in one embodiment, the monitor tree is defined in the monitor configuration data 940 as interpreted by the central monitoring service.

Figure 10B:
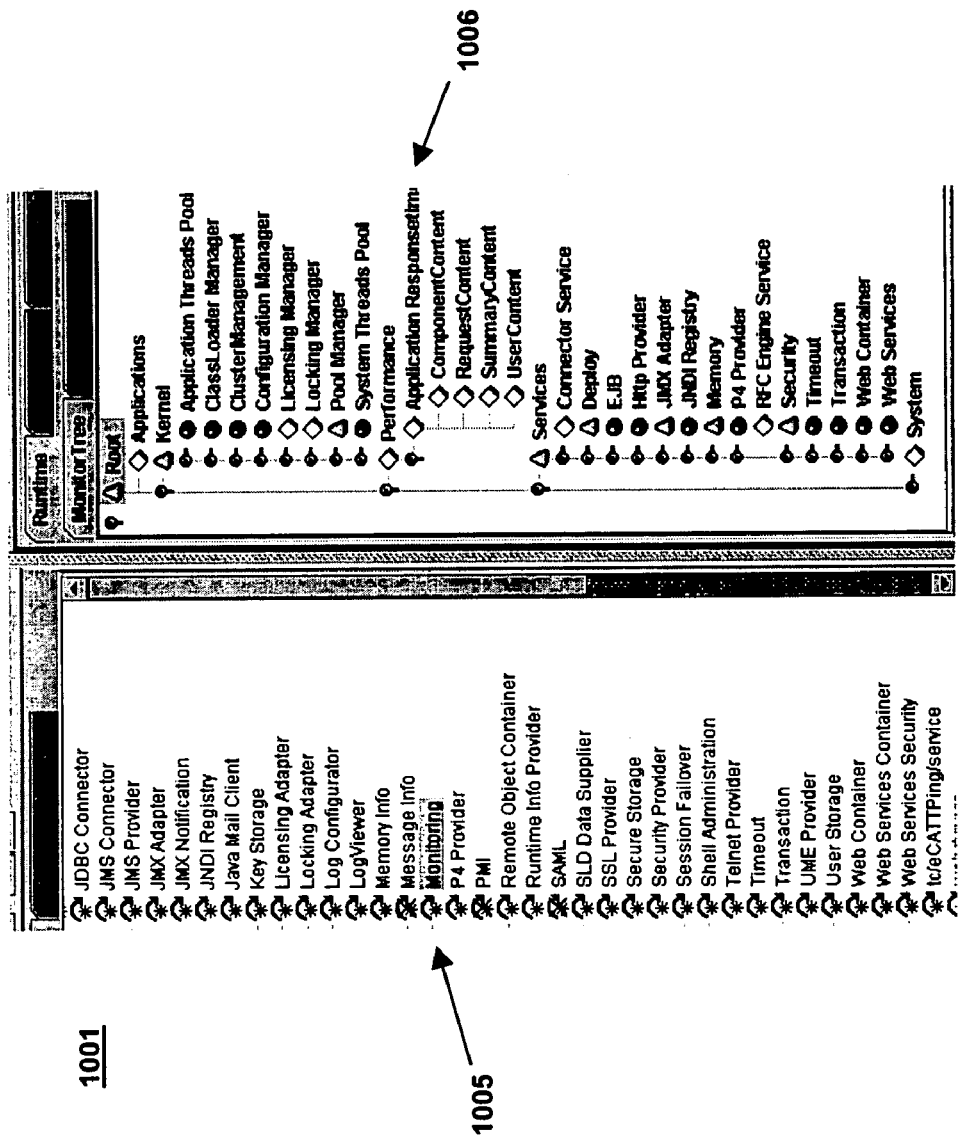

FIG. 10b illustrates another view of the monitor viewer 1000 in which a global configuration tab 1005 is selected in the first window. As a result, a hierarchical monitor tree 1006 containing monitor data related to the entire cluster (i.e., "global" information) is displayed in the second window. Specifically, the monitor tree 1006 displays global information related to applications, kernel resources, system performance criteria, and services. It should be noted, of course, that specific types of monitor data are illustrated in FIGS. 10a-b merely for the purpose of illustration. Various other types of cluster-related monitoring data may be compiled and displayed while still complying with the underlying principles of the invention.

As described above, MBeans may be used to represent and provide data related to virtually any type of system resource (e.g., a manager, service, application, ... etc). In one embodiment of the invention, during runtime, data may either be pulled periodically from the underlying MBean/resource ("passive instrumentation") or, alternatively, the MBean/resource may be configured to push the monitoring data to the monitor service using a specified event mechanism ("active instrumentation").

Figure 11A:
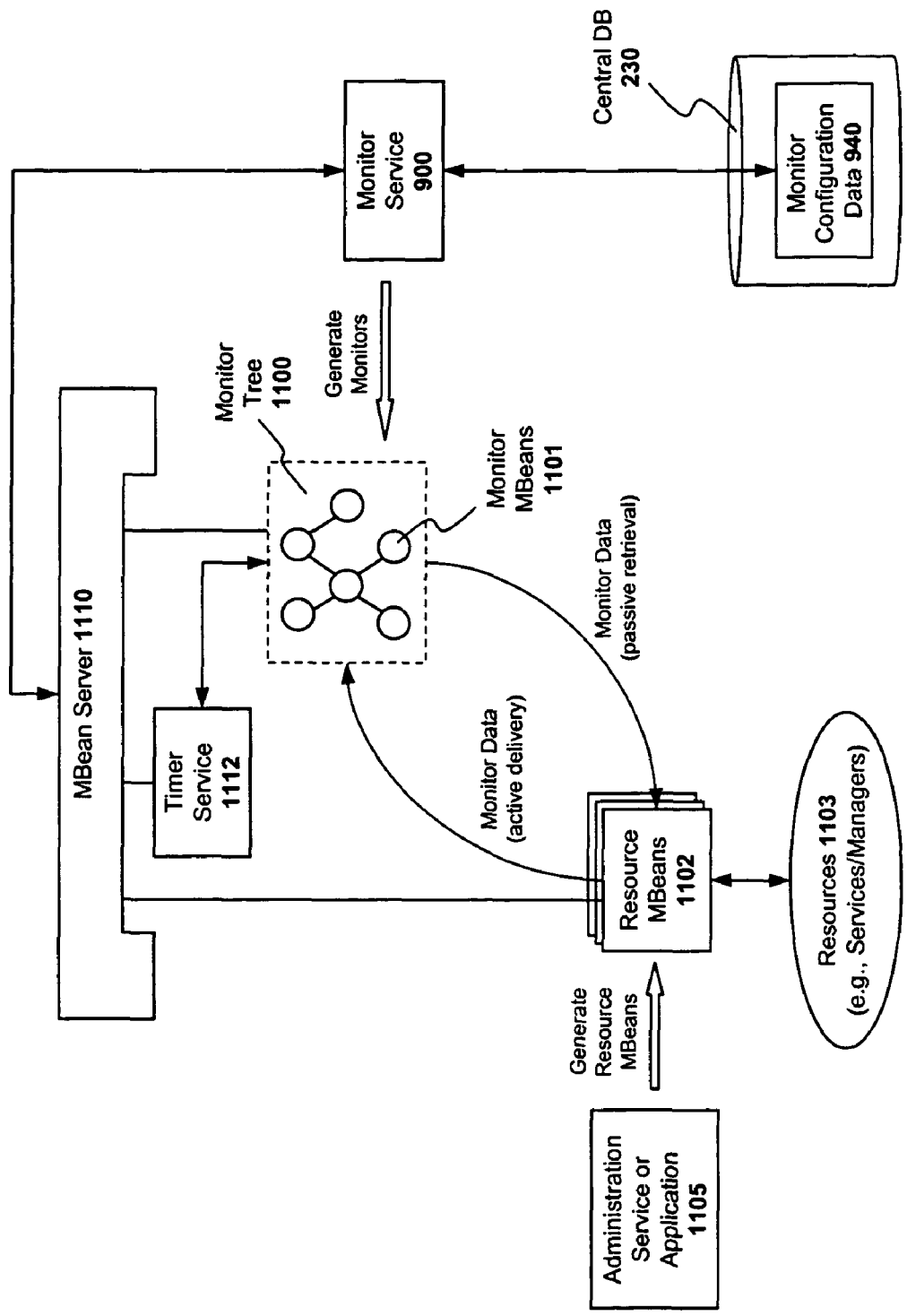
FIG. 11a illustrates a monitoring architecture according to one embodiment of the invention.

One particular embodiment, illustrated in FIG. 11a, employs two different types of MBeans to perform passive and/or active instrumentation functions: resource MBeans 1102 (also referred to herein as "runtime" MBeans) and monitor MBeans 1101. Resource MBeans, also referred to herein as "runtime" MBeans, are associated with the underlying system resources such as kernel resources, components, libraries, ... etc. Monitor MBeans are generated by the central monitor service 900 and are mapped to the resource MBeans according to the monitoring configuration data 940 stored within the central database 230.

Figure 11B:
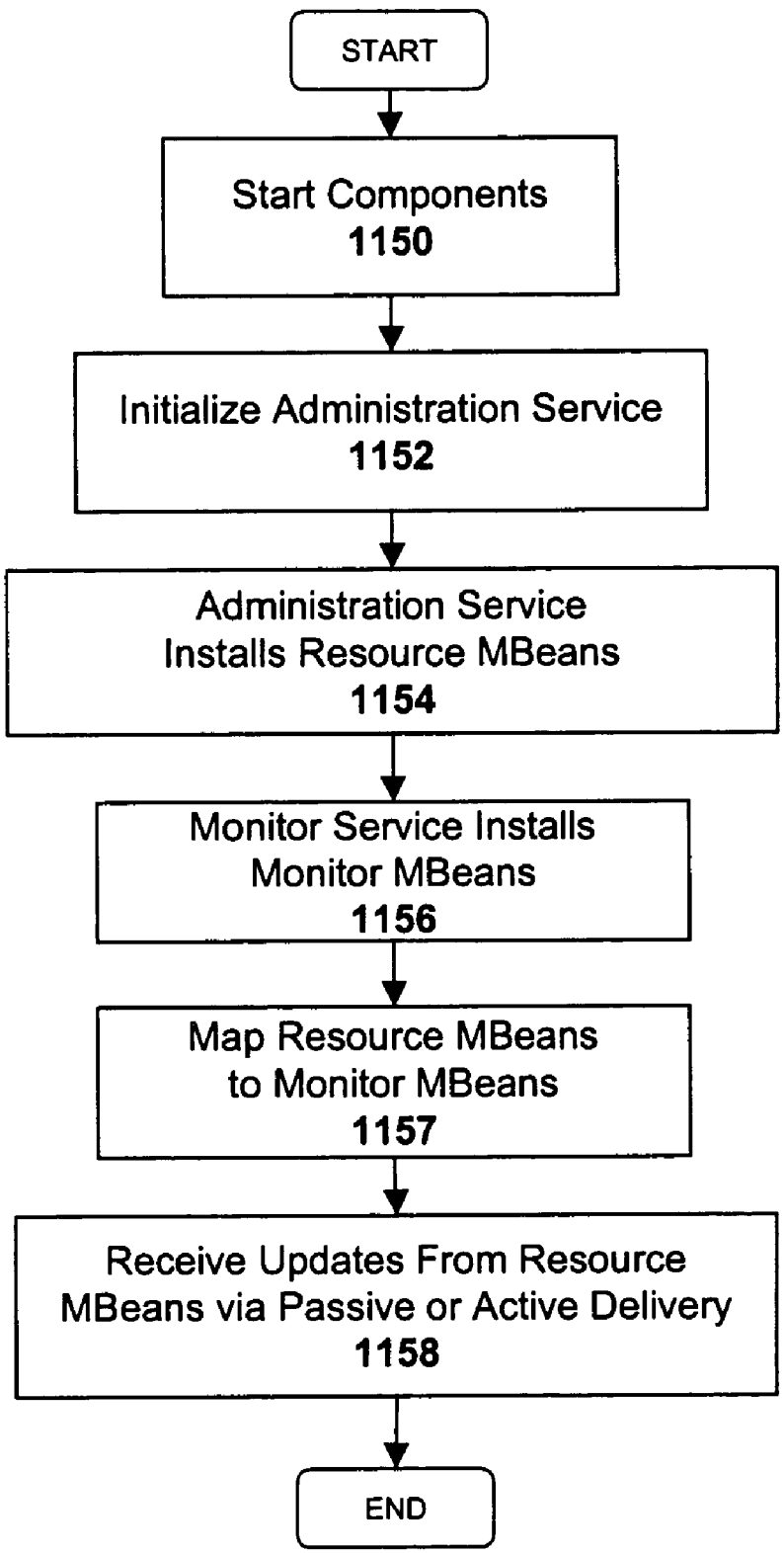
FIG. 11b illustrates one embodiment of a method for starting the monitoring architecture.

FIG. 11b illustrates a monitor initialization process utilized within the architecture of FIG. 11a. At 1150, the J2EE components required to run the monitor architecture are started (e.g., the management interfaces). At 1152, the components then install/initialize the administration service (or application) 1105. The administration service is also illustrated and described below with respect to FIG. 13. At 1154, the administration service 1105 installs the resource MBeans used to monitor specified resources within each node in the cluster. In one embodiment, the administration service 1105 uses the monitor configuration data 940 within the central database 230 to identify the resource MBeans to install. The administration service 1105 may communicate with the central monitor service 900 throughout the initialization process to coordinate the retrieval of MBean data form the central database 230 and to coordinate the mapping of resource MBeans to monitor MBeans (as described below).

At 856, the central monitor service 900 installs the monitor MBeans 1101 based on the monitor configuration data 940 stored within the central database 230. In one embodiment, the central monitor service 900 arranges the Monitor MBeans 1101 within a hierarchical monitor tree 1100, representing the logical relationships between the resources in each of the nodes in the cluster. As mentioned above, monitor information from the monitor tree 1100 (or subsections thereof) may be displayed within a graphical visual administrator 930 or other user interface.

At 1157, resource MBeans 1102 are mapped to monitor MBeans 1101 within the monitor tree 1100, thereby establishing a link between each monitor MBean and the resource which it represents. For example, each monitor MBean 801 within the monitor tree 1100 may have a resource identifier associated therewith, identifying the resource (or resource MBean) which it represents. Once the mapping is complete, the monitoring architecture is executed and, at 1158, monitor updates are provided from the resource MBeans to their associated monitor MBeans. The monitor updates may then be displayed as a monitor tree within the visual administrator 930.

As mentioned above, different types of monitor updates may be employed within the system. By way of example, and not limitation, this may include string monitors which monitor text as a string value; integer monitors which monitor an 'int' value; table monitors which monitor a table containing a header and contents (e.g., wherein each header element is a string and each table element is a serializable object); state monitors which are similar to string monitors but have the additional property of assigning colors (e.g., green, yellow, red) to the string values (e.g., for indicating the state of the associated resource within the visual administrator); availability monitors which monitor a boolean value indicating whether the resource is available; frequency monitors which compute a frequency according to reported number of events given at specific times; quality rate monitors which compute an average (and actual) quality rate according to reported number of total tries and successful tries (e.g., one successful try from a total amount of 10 tries would result in a quality rate of 10%); pool monitors which monitor a pool characterized by (a) configurable values for minimum/maximum pool size, initial pool size and increment size when increasing the pool, and (b) runtime values for the number of current used objects and current pool size; and cache monitors which monitor a cache characterized by a configurable maximum cache size and/or the number of current used objects. It should be noted, however, that the foregoing examples are for the purpose of illustration only. The underlying principles of the invention are not limited to any particular monitor types.

In addition, as mentioned above, resource data may either be pulled periodically from the underlying resource MBean ("passive instrumentation") or, alternatively, the resource MBean may be configured to push the monitoring data to the monitor service using a specified event mechanism ("active instrumentation"). Different examples of resource data transmission are described below with respect to FIGS. 12*a-c*.

Figure 12A:
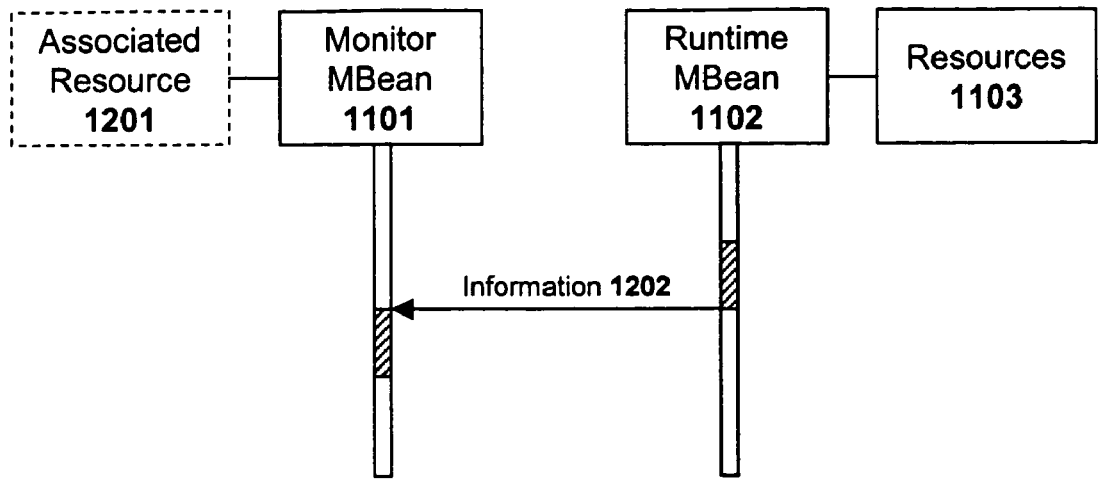
FIGS. 12a-c illustrate different data delivery paradigms employed in different embodiments of the invention.

FIG. 12*a* illustrates one embodiment of an "active" or "push" data delivery paradigm in which a runtime MBean 1102 actively transmits monitoring data related to the resource 1103 with which it is associated, without first receiving a request from the monitor MBean. For example, the runtime MBean 1102 may transmit updates periodically and/or when the monitored value of the resource 1103 changes by a specified amount (e.g., when it reaches a specified threshold value).

Figure 12B:
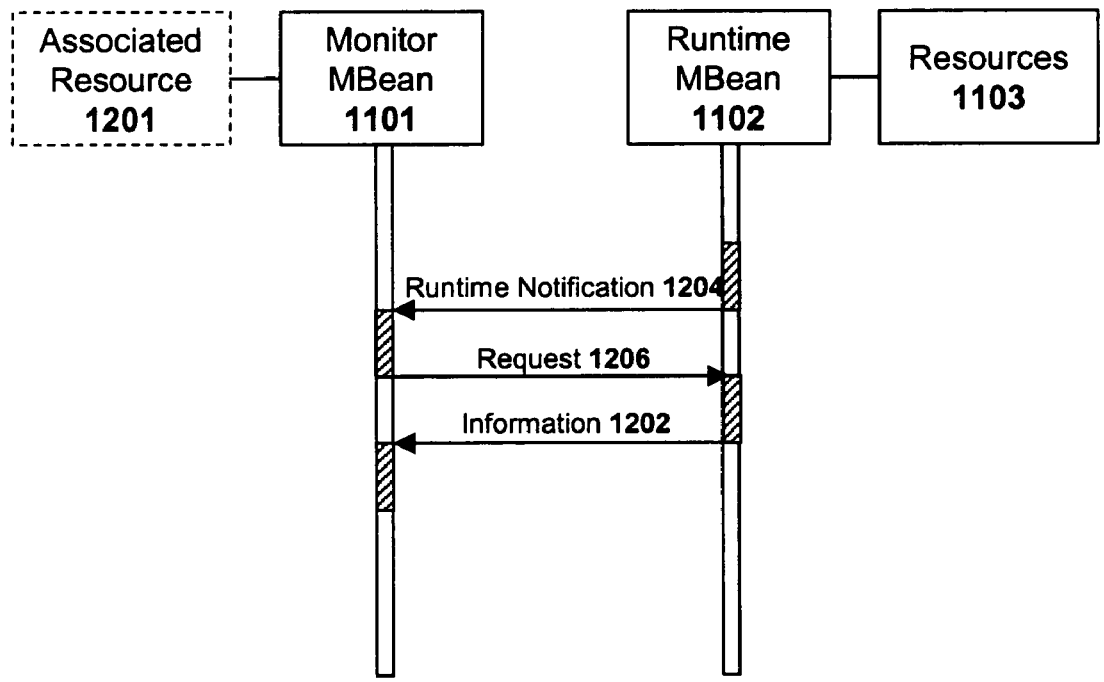

By contrast, FIG. 12*b* illustrates an embodiment in which the runtime MBean 1102 transmits a runtime notification 1204 to the monitor bean 1101, thereby notifying the monitor MBean that new monitoring data related to the associated resource 1201 is available. Upon receiving the notification 1204 from the runtime MBean 1102, the monitor bean 801 may send a request 1206 to the runtime MBean 1102 requesting the new monitoring data. In response, the runtime MBean 1102 transmits the information 1202 including monitoring data regarding the associated resource 1201 to the monitor MBean 1101. Alternatively, depending on the configuration of the monitor bean 1101, it may choose not to retrieve the information 1202.

Figure 12C:
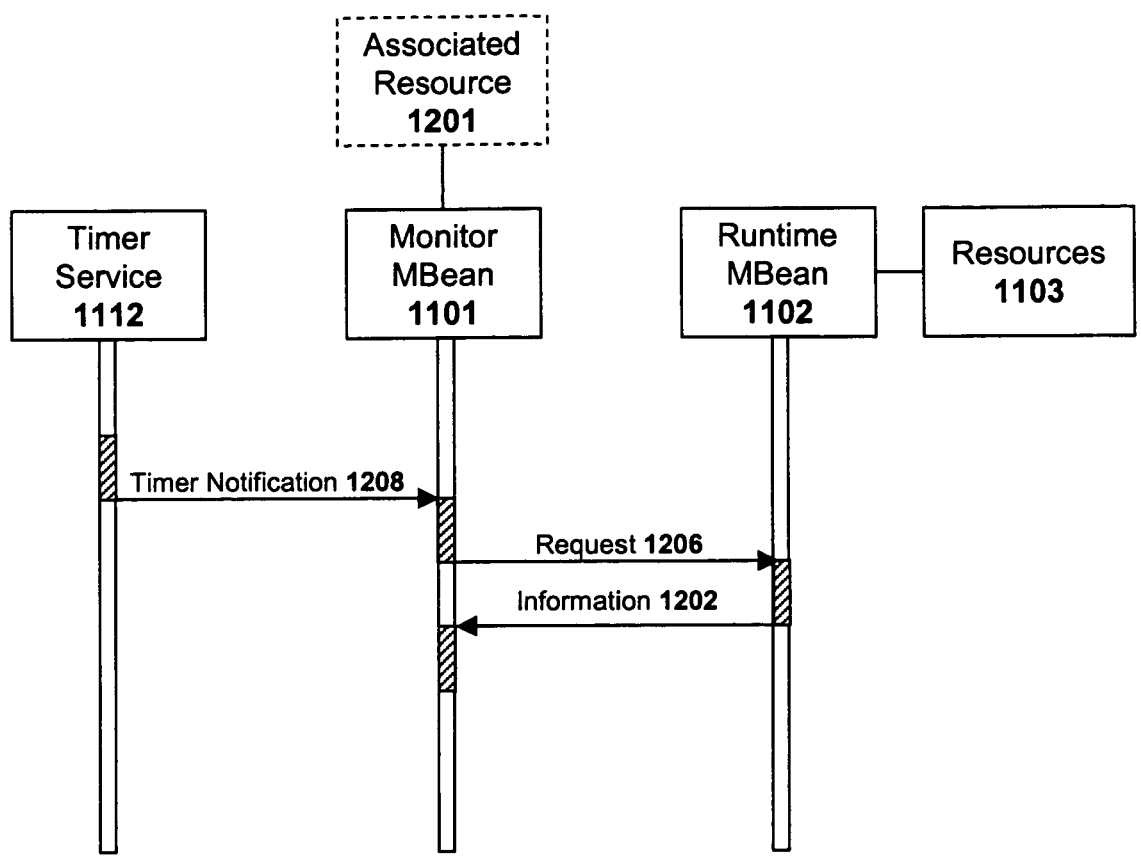

FIG. 12*c* illustrates an embodiment of a "passive" or "pull" paradigm in which the resource MBean 1102 transmits information 1202 related to its resource 1103 in response to a request 1206 from the monitor MBean 1101. In addition, in this embodiment, the monitoring data transmission sequence may be controlled via a timer service 1112 associated with the MBean server 1110. For example, the timing service 1112 may be programmed to trigger the monitor MBean request 1206 periodically (e.g., every few seconds).

In one embodiment, the specific data delivery mechanism employed for each monitor MBean and each Resource MBean is user-configurable (e.g., via the visual administrator 930 or other graphical management client). The user may employ an active data delivery mechanism for some types of resources and a passive data delivery mechanism for other types or resources. For example, resources identified as having a relatively higher priority may be configured with active data delivery mechanisms (such as those illustrated in FIGS. 12*a-b*), whereas resources which are identified as having a relatively lower priority may be configured with passive mechanisms (such as those illustrated in FIG. 12*c*). Accordingly, high priority resource updates will be communicated immediately from runtime beans 1102 to monitor beans 1101 (and displayed for the administrator) in response to the resource reaching a predetermined threshold value.

By contrast, relatively low priority resource updates may only be provided by the runtime bean 1102 upon request from the monitor bean 1101. As mentioned above, the request may be triggered by the timer service 1112 and/or in response to a manual request for the resource information via the visual administrator or other graphical administration interface.

Whether a resource is identified as "high" or "low" priority is dependent on the particular requirements of the end user. As a general rule, however, resources which are required for the application server to function properly (e.g., memory resources, threads, available mass storage space) may be placed above those resource which are not required for basic system functionality (e.g., logging and tracing functions). In one embodiment, a default/suggested configuration for critical and non-critical resources is provided, which may then be modified by the system administrator.

In addition, in one embodiment, individual runtime beans and resource beans may be configured to provide both active and passive delivery functions, depending on the conditions of their monitored resources. For example, a particular runtime bean may be configured to provide passive updates in response to timer-triggered or user-triggered requests and to also provide active updates in response to the resource reaching a specified threshold value.

Various different resources may be monitored using the active/passive data delivery techniques described above. By way of example, and not limitation, these may include network connection resources, threads, processor usage on each server node, classloaders, database connections, database transactions, HTTP cache size and/or the number of current used objects, JAVA™ Messaging Service ("JMS") queues and topics, server socket connections, and sessions.

Figure 13:
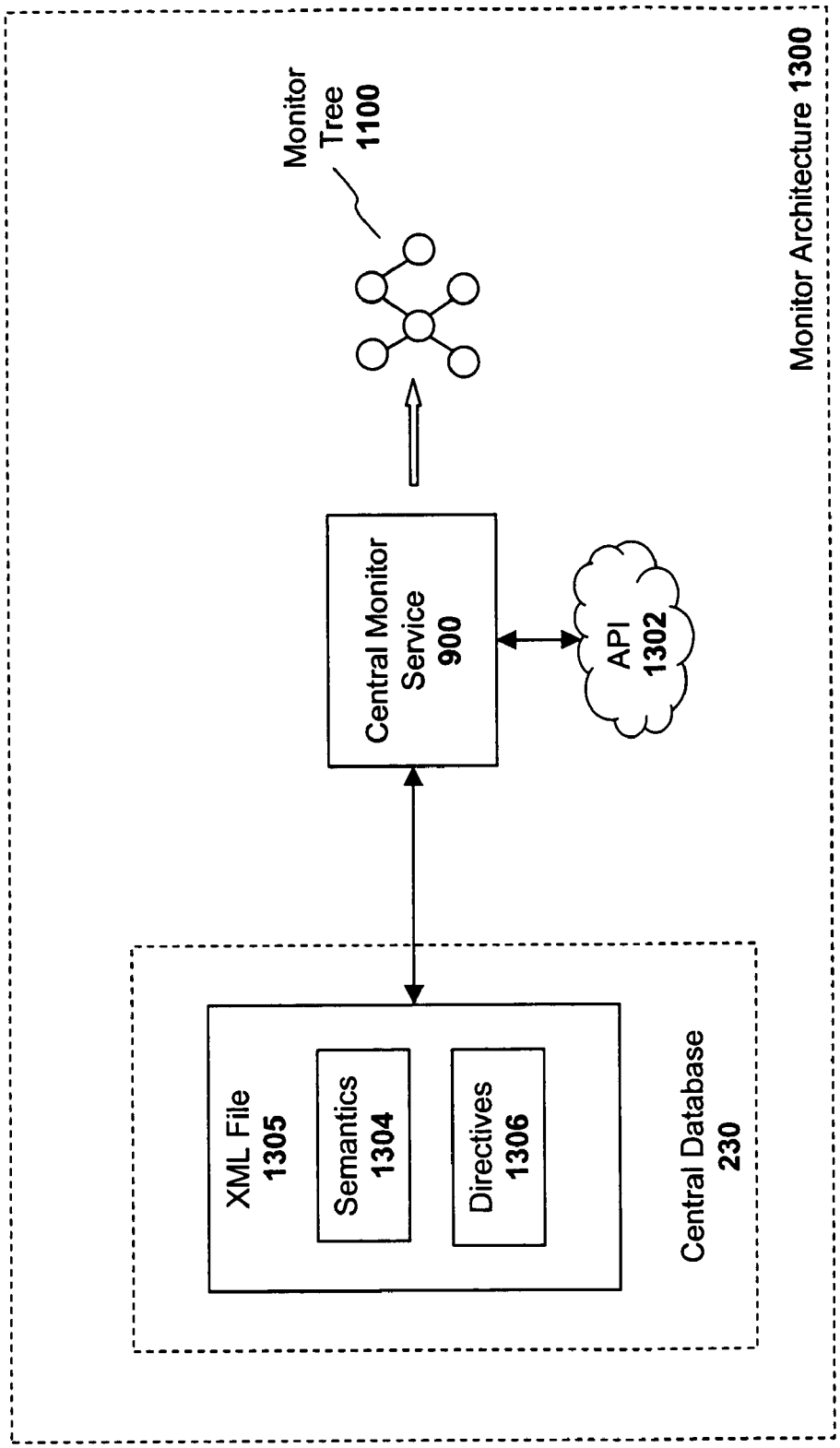
FIGS. 13-14 illustrate embodiments of the invention in which the monitor configuration data is stored within an extensible markup language ("XML") file.

FIG. 13 illustrates an embodiment in which the monitor configuration data 940 is stored in an Extensible Markup Language ("XML") format. According to this embodiment, the central monitor service 900 of the monitoring architecture 1300 generates a monitor tree 1100 based on the semantics 1304 and directives 1306 of an XML file 1305 stored within the central database 230.

In one embodiment, the XML technology is integrated with a JAVA™ 2 Platform Enterprise Edition (J2EE) engine for electronic data interchange, and due to XML's characteristics of being broad and relatively easy to use. To support and build the XML technology, including the XML file 1305, in the J2EE engine, application programming interfaces ("APIs") 1302 may be employed to use the XML file 1305 to configure various components and application modules. For example, the XML file 1305 may be used to facilitate components and modules of the monitor service 900 to generate the monitor tree 1100.

According to one embodiment, the API 1302 may is a JAVA™-compliant API. Examples of JAVA™ APIs include the J2EE XML API, JAVA™ API for XML Processing ("JAXP"), JAVA™ Messaging Service ("JMS") API, JAVA™ API for XML Messaging ("JAXM"), JAVA™ Transaction API ("JTA"), JAVA™ API for XML-Remote Procedure Call ("JAX-RPC"), JAVA™ API XML Binding ("JAXB"), and JAVA™ API for XML Registries ("JAXR"), to name a few. The API 1302 may facilitate both the creation and customization of the monitor tree 1100 as well as the reporting of the monitoring information and values. Multiple XML files may be used and similarly, multiple API may be used to generate the monitor tree 1100.

As mentioned above, the XML file 1305 may include semantics 1304 and directives 1306 used by the monitor service 900 to generate the monitor tree 1100. The semantics 1304 of the XML file 1305 comprises the primary information about the monitor tree 1100, the monitor MBeans (monitor beans), and the resources to be monitored by each of the MBeans. The semantics 1304 include a code or a set of instructions for generating the monitor tree 1100. The set of instructions may include, for example, the instructions for setting color-coded marks representing corresponding status of the resources within the visual administrator 930 or other graphical interface or system 931 (e.g., within the displayed monitor tree). For example, in one embodiment, a green mark indicates monitoring of the corresponding resource; a yellow mark indicates continuous monitoring of the corresponding resource, and may also indicate that the resource being monitored may be reaching a critical value or stage; and a red mark indicates that the corresponding resource may have reached a critical value. Finally, a white mark may indicate inactivity, or that the corresponding resource is not being monitored. Of course, the underlying principles of the invention are not limited to any particular set of color-coded marks.

According to one embodiment, the directives 1306 specify the form in which the monitor tree 1100 is generated. Stated differently, the directives 1306 provide installation instructions on how the semantics 1304 are to be implemented. For example, the directives 1306 may include one or more templates to match various monitor beans with corresponding associated resources at various nodes of the monitor tree 1100. The monitor service 900 employs the API 1302 to generate the monitor tree 1100 based on the semantics 1004 and the directives 1306.

The semantics 1304 and the directives 1306 of the XML file 1305 may include elements (e.g., similar to HyperText Markup Language ("HTML") tags) to provide context to the information contained within the XML file 1305. The XML file 1305 may be document-centric to be used by humans or data-centric to be used by another software application or module containing data extracted from a database, such as the central database 230, and may be submitted to the API 1302.

Figure 14:
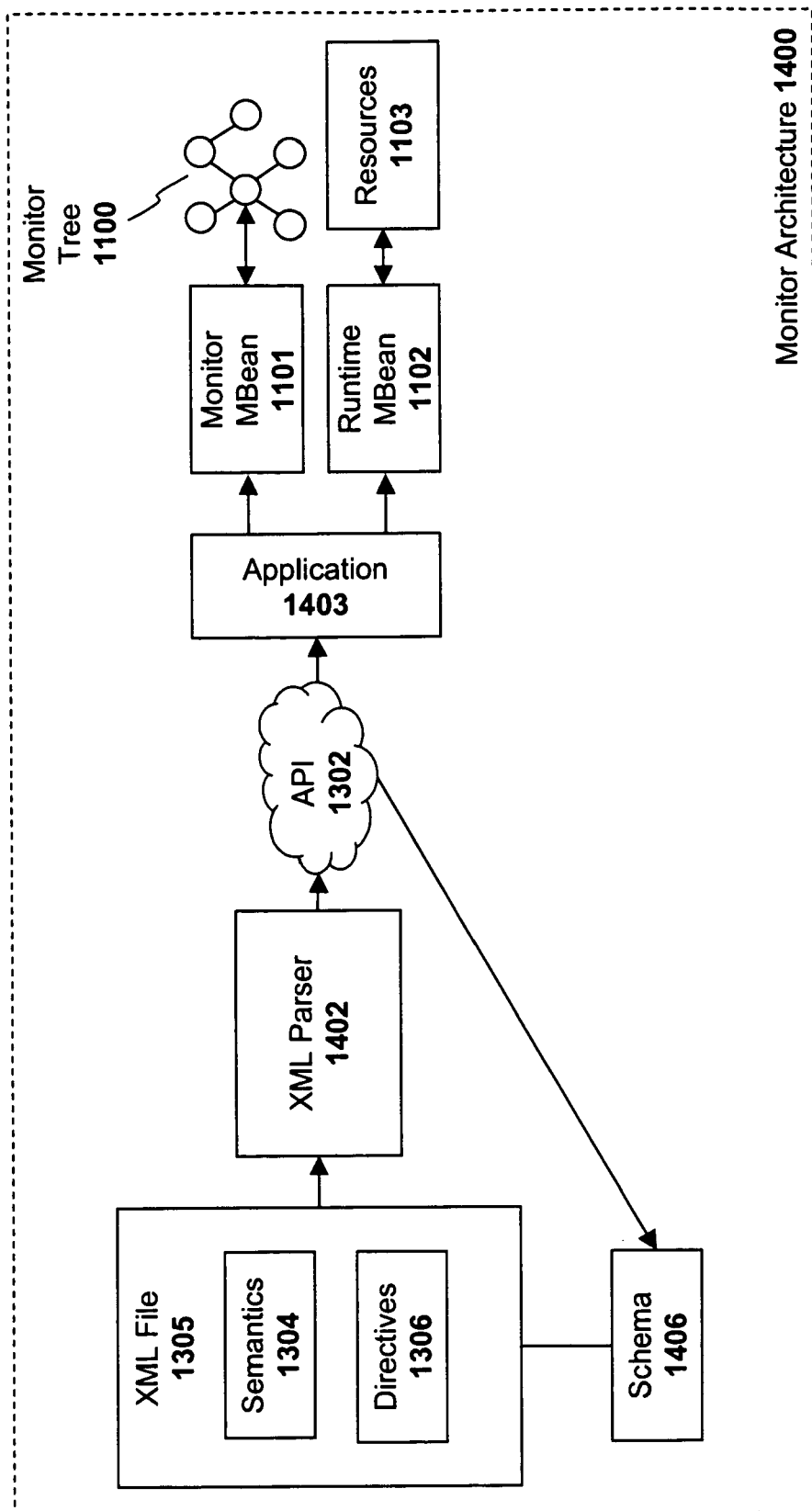

FIG. 14 illustrates additional details associated with the interpretation of the XML file 1305. The semantics 1304, the directives 1306, and other components of the XML file 1005 may be parsed using an application known as the XML parser (or XML processor) 1402. The XML file 1305 and the schema (or scheme or plan) 1406, if any, associated with the XML file 1305 may be interpreted by the XML parser 1402 for parsing of the semantics 1304 and directives 1306 contained in the XML file 1305, and for organizing, formatting, and validating of the information.

The XML parser 1402 may provide an application 1404 (or other type of software module) with access to the elements of the XML file 1305 to establish a link between the XML file 1305 and other components or modules, such as the application programming interface ("API") 1302, of the monitoring architecture 1400. For example, the API 1302 and the XML parser 1402 may be used to generate the monitor tree 1100 (e.g., by assigning the various monitor MBeans 1101 to their associated resources at various nodes within the monitor tree 1100). According to one embodiment, for the purposes of customizing the monitor tree 1100, the API 1302 may include a bootstrapper which includes a code or a sequence of codes to initiate relationships between component agents and the MBeans 1101. Customizing of the monitor tree 1100 may include establishing values (e.g., thresholds, descriptions, . . . etc) that may be registered along with each monitor MBean 1101.

The XML file 1305 may be parsed in several ways including using the Document Object Model ("DOM"), which reads the entire XML file 1305 and forms a tree structure, or using the Simple API for XML ("SAX"), which is regarded as an event-driven parser that reads the XML file 1305 in segments.

The API 1302 may be a JAVA™ Management Extensions (JMX)-based API. Examples of JAVA™ or JMX-based APIs include J2EE XML API, JAVA™ API for XML Processing ("JAXP"), JAVA™ Messaging Service ("JMS") API, JAVA™ API for XML Messaging ("JAXM"), JAVA™ Transaction API ("JTA"), JAVA™ API for XML-Remote Procedure Call ("JAX-RPC"), JAVA™ API XML Binding ("JAXB"), and JAVA™ API for XML Registries ("JAXR").

As described above with respect to FIG. 12a, runtime MBeans 1102 may be configured to actively transmit monitoring information related to the resource 1103 with which they are associated. In addition, one embodiment illustrated in FIG. 15, employs a notification service 1501 to provide a comprehensive view of all of the notifications generated by the runtime MBeans across the entire cluster. For example, certain MBeans may be configured to generate active "notifications" to the notification service 1501 on certain specified events such as start/stop, get/set properties, etc, of their associated resources. The notification service 1201 then provides a cluster-wide indication of these specified events to any visual administrator (or other type of client) coupled to any node within the cluster. Two different users connected via two different machines may use the notification service to view a comprehensive, up-to-date state of the system.

Figure 15:
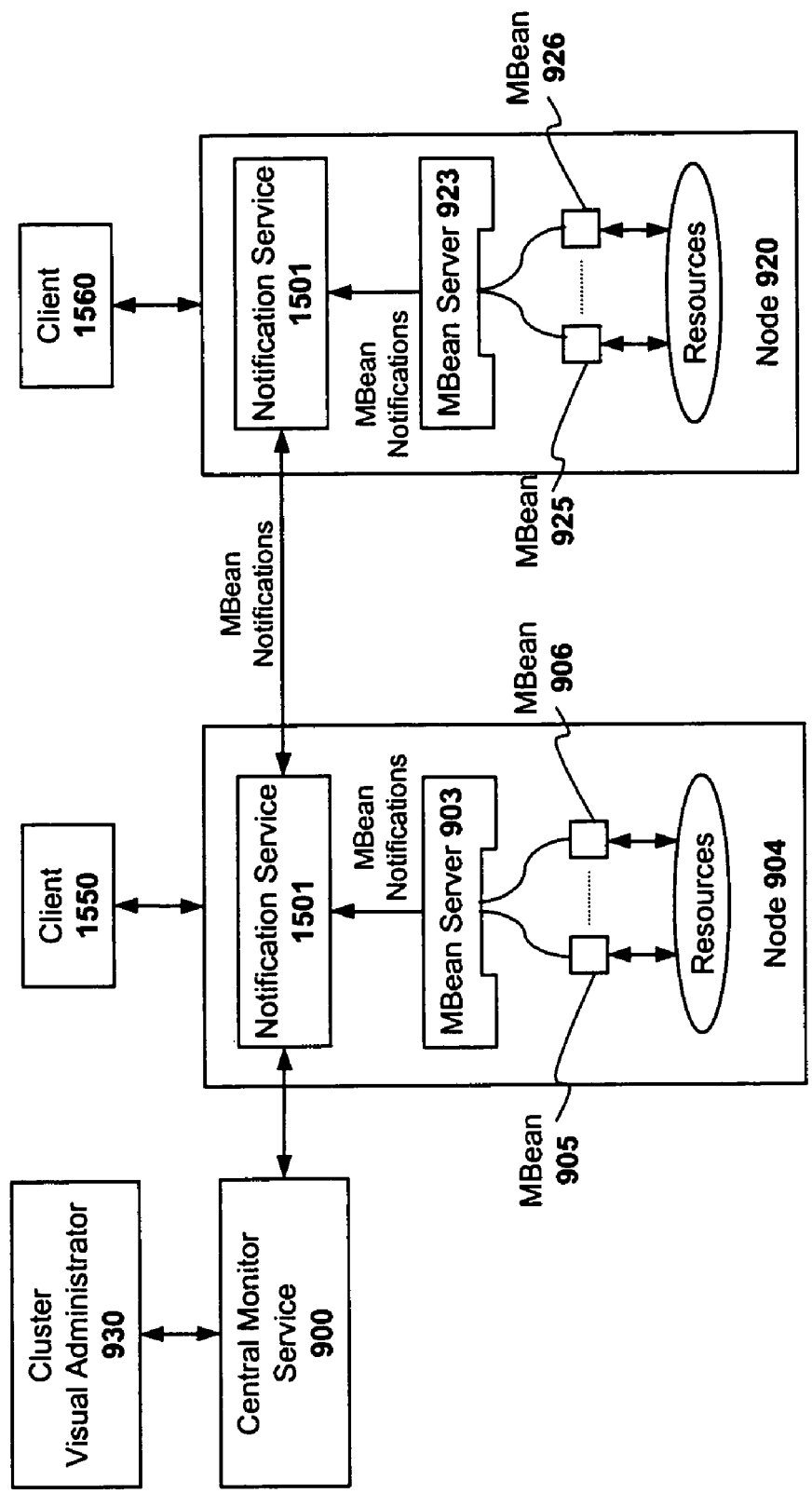
FIG. 15 illustrates a notification service employed in one embodiment of the invention to provide active cluster-wide notification updates.

Thus, referring to the specific example illustrated in FIG. 15, MBean 925 may be configured to generate active notifications in response to certain specified events. In response to detecting one of the events, the MBean 925 generates a notification which is received by the notification service 1501 (i.e., via MBean server 923). The notification service 1501 then communicates the MBean notification to all other nodes within the cluster and provides the notification to any objects that are registered with the notification service 1501 as listeners. Accordingly, the notification will be viewable from client 1550 coupled directly to node 904, as well as client 1560, coupled directly to the node on which the notification was generated. In other words, a single, unified view of cluster-wide notifications is available from any of the nodes in the cluster. In one embodiment, the notification service 1501 utilizes the message passing architecture provided via the central services instance 300 shown in FIG. 3 to enable cluster-wide communication of MBean notifications (e.g., by exchanging notifications via the messaging service 304).

Notifications may take on various forms while still complying with the underlying principles of the invention. In one embodiment, each notification will have a time stamp, sequence number, and a human-readable message indicating the type of notification, and the reason for the notification (e.g., a particular threshold value was reached, a resource went offline, . . . etc).

In one embodiment, a notification application programming interface is defined to enable use of notifications. For example, a "Notification Broadcaster" class may be employed for notification generators (e.g., MBean 925 in the previous example). In addition, a "Notification Listener" class may be employed for any objects interested in receiving notifications. In one embodiment, a "Notification Filter" class may also be defined for filtering out certain types of notifications (e.g., on behalf of certain specified Notification Listeners).

Figure 16:
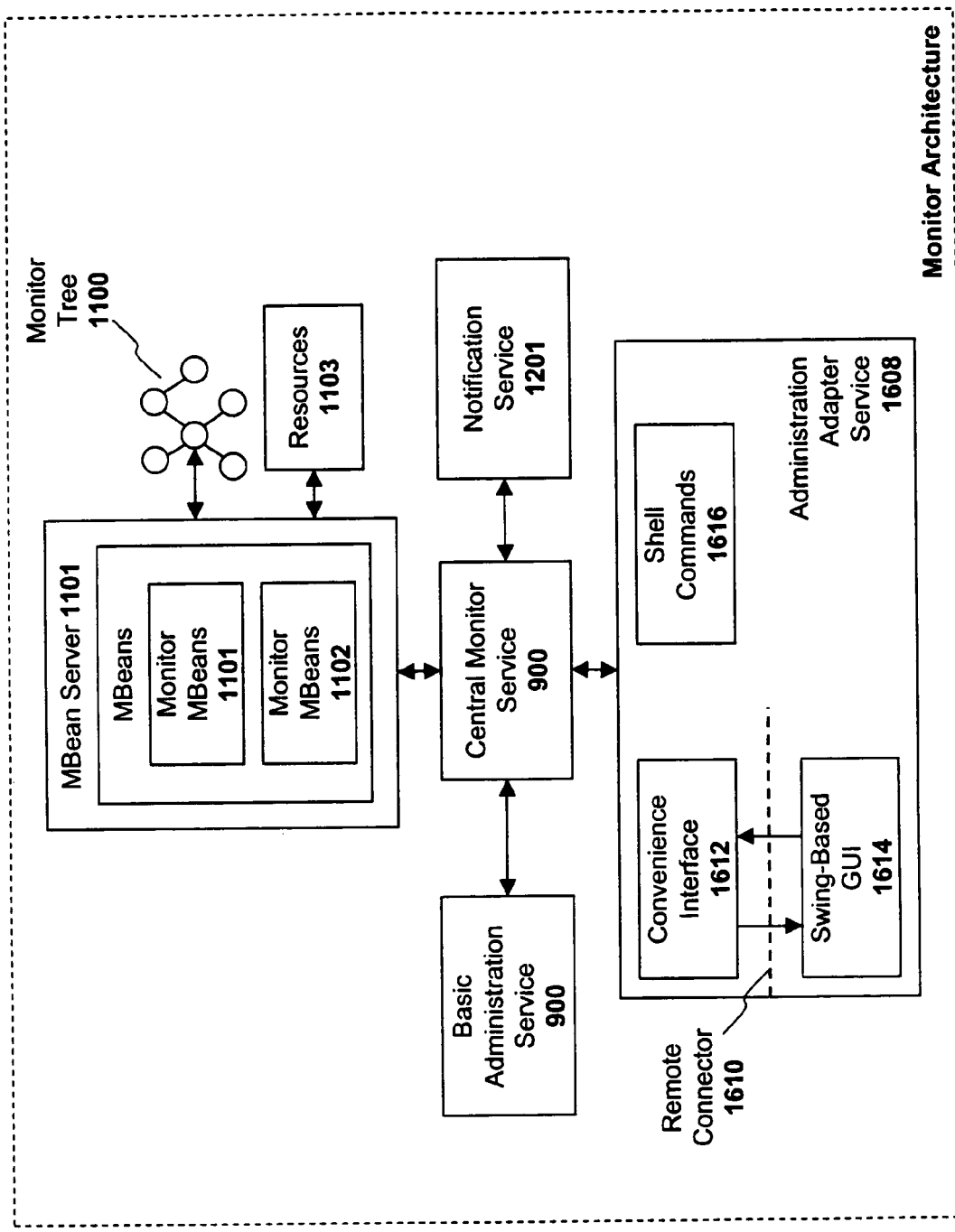
FIG. 16 illustrates an embodiment of the invention which includes a plurality of different management/monitoring services.

FIG. 16 illustrates a group of services for performing different resource monitoring functions according to one embodiment of the invention. In addition to the monitor service 900 and notification service 1501, the illustrated monitoring architecture includes a basic administration service (<basicadmin> or administration service) 1105 and an administration adapter service (<adminadapter> or adapter service) 1208. As described above with respect to FIG. 11a-b, the administration service 1105 provides instrumentation of certain modules and components (e.g., libraries and interfaces) and also facilitates registration of MBeans with the MBean server 1110 via the monitor service 900. Recall that monitor Mbeans 1101 registered with the MBean server 1110 represent individual tree nodes (nodes) of the monitor tree 1100. Each of the monitor MBeans 1101 may be used, for example, for reboot and shutdown, as well as for defining the type of nodes (e.g., dispatcher or server type nodes) and the resources associated with each of the nodes, for which monitoring information may be retrieved from runtime MBeans 1102. The runtime MBeans 1102 may be used for monitoring of all clusters and associated resources 1103.

In one embodiment, the administration service 1105 provides for registration of two logical types of MBeans: standard MBeans and specific beans. Standard MBeans may provide standard functionality of start/stop and get/set properties of their associated resources. Standard MBeans may be registered by default for all deployed components or resources (e.g., kernel, libraries, interfaces, services, etc). By contrast, specific beans may provide component-specific functionalities that may vary from one component to another. To have specific beans, a component may register an object that may implement a specific interface to list the processes available for its management and to extend the management interface (e.g., "com.company.engine.frame.state.Management Interface").

For kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans, and implementation of the management interface may also cause a specific bean to be registered for that particular service.

Figure 1:
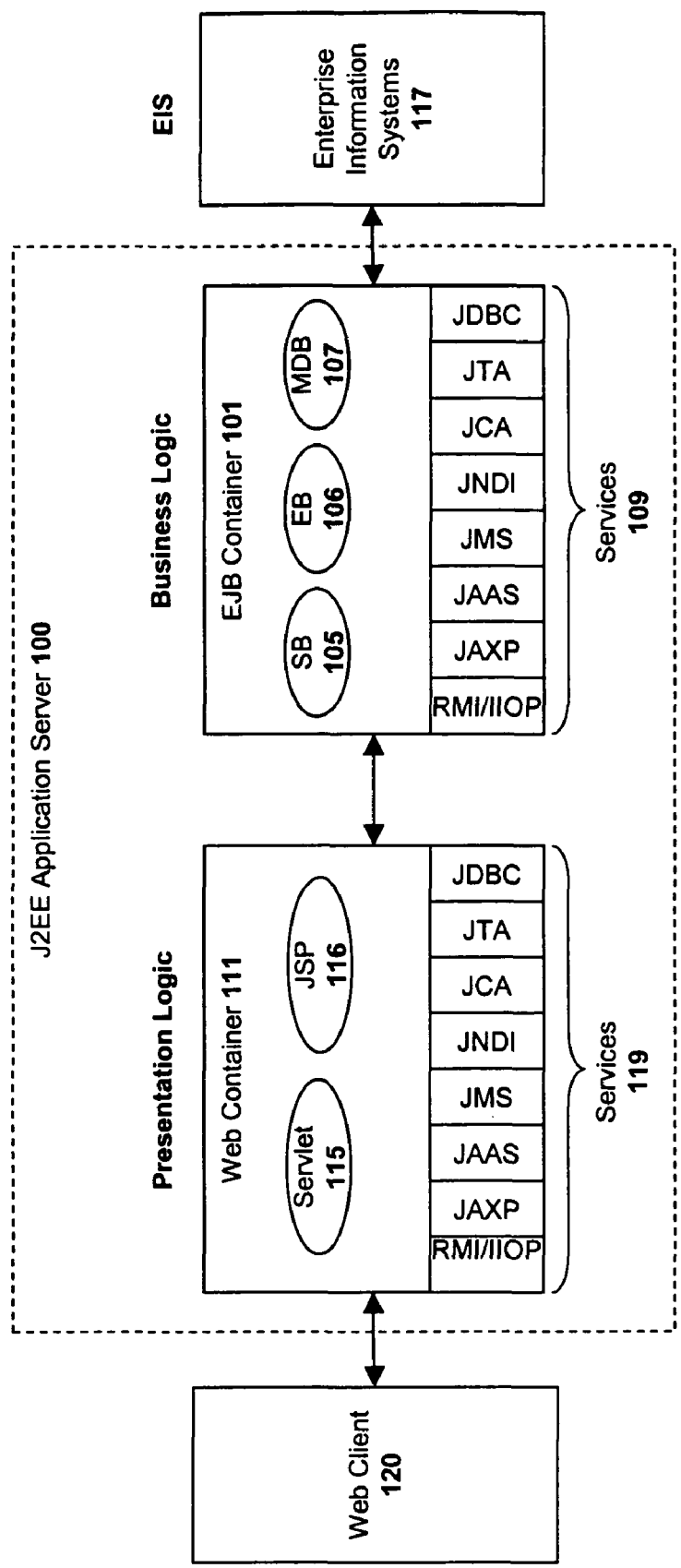
FIG. 1 illustrates a multi-tier enterprise architecture based on the J2EE standard.
Figure 2:
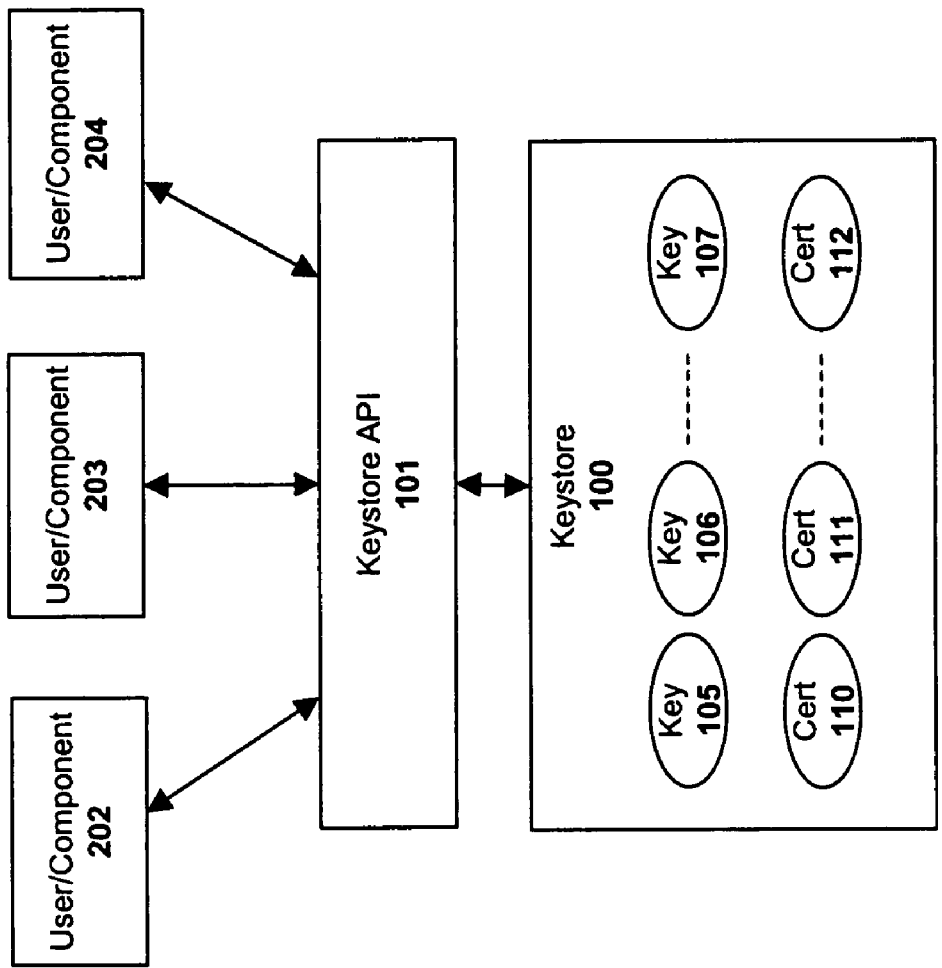
FIG. 2 illustrates a prior art keystore employed within a prior art multi-tier architecture.

The adapter service 1608 employed in one embodiment of the invention is part of the manager level 201 of the monitoring architecture (see, e.g., FIG. 2). The adapter service 1608 may include the following components: (1) a remote connector 1610; (2) a "convenience" interface 1612; (3) a "swing-based" Graphical User Interface ("GUI") 1614; and (4) a shell command interface 1616. The adapter service 1608 provides remote access to the MBean server 810 via The remote connector 1610. For example, users may connect from a remote client and view monitoring information relating to monitored resources 1103 via the remote connector 1610. Moreover, when used in conjunction with the notification service 1501, users will be provided with a comprehensive view of monitoring data from the entire cluster, as described above with respect to FIG. 16).

The convenience interface 1612 may allow users to remotely access the MBean server 1110 using remote administration tools. Remotely accessing the MBean server 1110 may include remotely accessing and working with the MBeans as registered by the administration service 1105 based on the semantics of the resources 1103 that are instrumented and monitored by the MBeans. Stated differently, the adapter service 1608 provides a high-level view of the MBean server 1110 and all other MBean servers within the cluster (e.g., as represented by the monitor tree 1100). This higher level view may be represented by a monitor tree, the root of which is an MBean that instruments the cluster. The adapter service 1608 may interpret the monitor tree 1100 and provide interfaces for managing each type of node within the monitor tree 1100. Various different node types may be defined. By way of example, the node types within the monitor tree may include a root node representing the cluster ("TYPE_CLUSTER_MBEAN"), a basic cluster node type representing a node within the cluster ("TYPE_CLUSTER_NODE_MBEAN"), a standard MBean that instruments the kernel of a cluster node ("TYPE_KERNEL_MBEAN"), a standard MBean that instruments a service ("TYPE_SERVICE_MBEAN"), a standard MBean that instruments a library ("TYPE_LIBRARY_MBEAN"), a standard MBean that instruments an interface ("TYPE_INTERFACE_MBEAN"), a standard MBean that instruments a defined group of clusters ("TYPE_GROUP"), and all other MBeans ("TYPE_UNSPECIFIED_MBEAN"). It should be noted, however, that the underlying principles of the invention are not limited to any particular set of MBean types.

The swing-based GUI 1614 employed in one embodiment of the invention may use the convenience interface 1612 and the monitor tree 1100 to represent the management functionality of the monitoring architecture to a network administrator or end user. The console counterpart of the GUI administrator may consist of various shell commands 1616 that may be grouped together in an administration command group.

Figure 17:
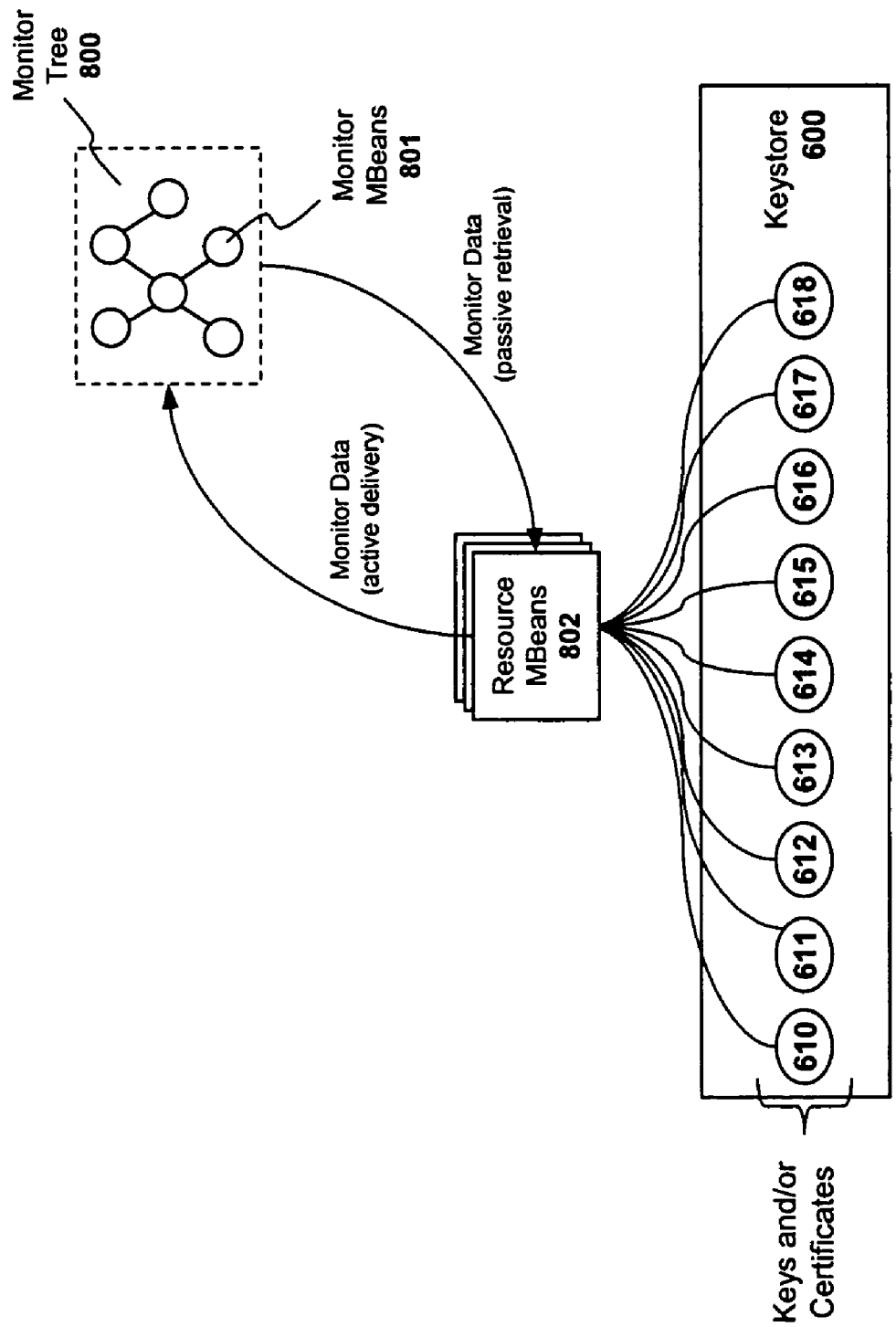
FIG. 17 illustrates one embodiment of the invention in which a monitoring service is configured to monitor keystore data.

As mentioned above, monitors may be provided to monitor different aspects of the keystore. In one embodiment, illustrated in FIG. 17, resource Mbeans 1102 are associated with different keys or digital certificates 910-918. The resource Mbeans 1102 may be configured to monitor the status of the digital certificates and ensure that the digital certificates valid and up-to-date. For example, a particular resource Mbean may trigger an alert when the digital certificate with which it is associated reaches a certain age (e.g., when the certificate is within a week of expiring). When the certificate reaches this threshold, the resource MBean may generate a notification to the system administrator that the certificate needs to be replaced. In one embodiment, this is accomplished via the central monitor service 900 illustrated in FIG. 9 and/or the notification service 1501 illustrated in FIG. 15.

In addition, runtime Mbeans may be configured to deliver monitoring data related to the keystore using any of the data delivery mechanism described above with respect to FIGS. 12*a-c*. For example, in an "active" or "push" data delivery paradigm the runtime MBean 1102 actively transmits monitoring data related to the keystore certificate with which it is associated. By contrast, in one embodiment, runtime MBeans may also be configured to transmit runtime notifications to their respective monitor Mbean 1101, thereby notifying the monitor MBean that new monitoring data related to the keystore is available. Upon receiving the notification 1204 from the runtime MBean 1102, the monitor bean 1101 may send a request 1206 to the runtime MBean 1102 requesting the new monitoring data. In response, the runtime MBean 1102 transmits the information 1202 including monitoring data regarding the keystore to the monitor MBean 1101. Alternatively, depending on the configuration of the monitor bean 1101, it may choose not to retrieve the information 1202.

Alternatively, in a "passive" or "pull" paradigm (see FIG. 12*c*) the resource MBean 1102 transmits information 1202 related to the keystore only in response to a request 1206 from the monitor MBean 1101. As mentioned above, in this embodiment, the monitoring data transmission sequence may be controlled via a timer service 1112 associated with the MBean server 1110. For example, the timing service 1112 may be programmed to trigger the monitor MBean request 906 periodically (e.g., every few seconds).

In addition, as described above, in one embodiment, the specific data delivery mechanism employed for each monitor MBean and each piece of keystore data (e.g., key or certificate) is user-configurable (e.g., via the visual administrator 930 or other graphical management client). Thus, the user may employ an active data delivery mechanism for some types of keystore data and a passive data delivery mechanism for other types of keystore data. For example, keystore data identified as having a relatively higher priority (e.g., such as digital certificates) may be configured with active data delivery mechanisms (such as those illustrated in FIGS. 12*a-b*), whereas resources which are identified as having a relatively lower priority may be configured with passive mechanisms (such as those illustrated in FIG. 12*c*). Accordingly, high priority resource updates will be communicated immediately from runtime beans 1102 to monitor beans 1101 (and displayed for the administrator) in response to the resource reaching a predetermined threshold value (e.g., a certificate reaching a specified age). By contrast, relatively low priority resource updates may only be provided by the runtime bean 1102 upon request from the monitor bean 1101.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on a JMX implementation within a J2EE environment, certain underlying principles of the invention are not limited to any particular specification. For example, the invention may be implemented within the context of other object-oriented and non-object-oriented programming environments, and may also be employed within future releases of the JAVA™ standard, or other standards (e.g., Microsoft's® .NET standard).

Moreover, while the embodiments described above employ a specific active and/or passive data delivery mechanism in which runtime MBeans communicate resource data to monitor MBeans, management objects other than JAVA™ MBeans may be employed while complying with the underlying principles of the invention. For example, different types of runtime management objects may be used instead of runtime MBeans and different types of monitor management objects may be used instead of monitor MBeans.

Accordingly, the scope and spirit of the invention should be judged in terms of the claims which follow.

What is claimed is:

1. A method comprising:
receiving a request from a user and/or an application component to view keystore data;
implementing a first set of security restrictions associated with the request to view the keystore data, the keystore data comprising a full set of keys and/or certificates;
providing a limited view of the keystore data to the requesting user and/or application component based on the results of the first set of security restrictions, wherein the limited view of the keystore data comprises a subset of the full set of keys and/or certificates, and wherein the subset is specific to the user and/or application component;
detecting an attempt by the user and/or application component to access specified portions of the keystore data provided in the view;
implementing a second set of security restrictions associated with the attempt to access the specified portions of the keystore data; and
providing limited access to the keystore data to the user and/or application component based on the results of the second set of security restrictions.

2. The method as in claim 1 wherein the keystore data comprises a digital certificate and wherein implementing the first set of security restrictions comprises determining whether the user and/or application component is permitted to view the digital certificate.

3. The method as in claim 2 wherein the digital certificate is an X.509 certificate.

4. The method as in claim 2 wherein implementing the second set of security restrictions comprises determining whether the user and/or application component is permitted to access the digital certificate.

5. The method as in claim 1 wherein implementing the first set of security restrictions and/or the second set of security restrictions includes authenticating the user and/or application component.

6. The method as in claim 5 wherein authenticating the user and/or application component comprises requiring entry of a valid password from the user and/or application component.

7. The method as in claim 1 further comprising:
distributing copies of the keystore data across a plurality of server nodes; and
implementing a distributed keystore management policy to ensure that the distributed copies of the keystore data remain valid at each of the server nodes.

8. A system comprising:
a plurality of server nodes communicatively coupled on an enterprise network, the plurality of server nodes to serve applications over the enterprise network to a plurality of clients;
a keystore to store security data on one or more of the server nodes; and
a keystore provider service executed on one or more of the server nodes, the keystore provider service to:
implement a first set of security restrictions associated with a request from a user and/or an application component to view keystore data, the keystore data comprising a full set of keys and/or certificates;
provide a limited view of the keystore data to the requesting user and/or application component based on the results of the first set of security restrictions, wherein the limited view of the keystore data comprises a subset of the full set of keys and/or certificates, and wherein the subset is specific to the requesting user and/or application component;
detect an attempt by the user and/or application component to access specified portions of the keystore data provided in the view;
implement a second set of security restrictions associated with the attempt to access the specified portions of the keystore data; and
provide limited access to the keystore data to the user and/or application component based on the results of the second set of security restrictions.

9. The system as in claim 8 wherein the keystore data comprises a digital certificate and wherein implementing the first set of security restrictions comprises determining whether the user and/or application component is permitted to view the digital certificate.

10. The system as in claim 9 wherein the digital certificate is an X.509 certificate.

11. The system as in claim 9 wherein implementing the second set of security restrictions comprises determining whether the user and/or application component is permitted to access the digital certificate.

12. The system as in claim 8 wherein implementing the first set of security restrictions and/or the second set of security restrictions includes authenticating the user and/or application component.

13. The system as in claim 12 wherein authenticating the user and/or application component comprises requiring entry of a valid password from the user and/or application component.

14. An article of manufacture including a non-transitory machine-readable medium for storing program code which, when executed by a machine, causes the machine to perform the operations of:
receiving a request from a user and/or an application component to view keystore data;
implementing a first set of security restrictions associated with the request to view the keystore data, the keystore data comprising a full set of keys and/or certificates;
providing a limited view of the keystore data to the requesting user and/or application component based on the results of the first set of security restrictions, wherein the limited view of the keystore data comprises a subset of the full set of keys and/or certificates, and wherein the subset is specific to the user and/or application component;
detecting an attempt by the user and/or application component to access specified portions of the keystore data provided in the view;
implementing a second set of security restrictions associated with the attempt to access the specified portions of the keystore data; and
providing limited access to the keystore data to the user and/or application component based on the results of the second set of security restrictions.

15. The article of manufacture as in claim 14 wherein the keystore data comprises a digital certificate and wherein implementing the first set of security restrictions comprises determining whether the user and/or application component is permitted to view the digital certificate.

16. The article of manufacture as in claim 15 wherein the digital certificate is an X.509 certificate.

17. The article of manufacture as in claim 15 wherein implementing the second set of security restrictions comprises determining whether the user and/or application component is permitted to access the digital certificate.

18. The article of manufacture as in claim 14 wherein implementing the first set of security restrictions and/or the second set of security restrictions includes authenticating the user and/or application component.

19. The article of manufacture as in claim 18 wherein authenticating the user and/or application component comprises requiring entry of a valid password from the user and/or application component.

20. The article of manufacture as in claim 14 comprising additional instructions to cause the machine to perform the operations of:
distributing copies of the keystore data across a plurality of server nodes; and
implementing a distributed keystore management policy to ensure that the distributed copies of the keystore data remain valid at each of the server nodes.

\* \* \* \* \*